(12) United States Patent
Kobayashi et al.

(10) Patent No.: US 6,600,473 B1
(45) Date of Patent: Jul. 29, 2003

(54) PHOTOCONDUCTIVE SWITCHING ELEMENT, DEVICE USING IT, AND APPARATUS, RECORDING APPARATUS, AND RECORDING METHOD IN WHICH THE DEVICE IS INCORPORATED

(75) Inventors: Hideo Kobayashi, Nakai-machi (JP);
Takeo Kakinuma, Nakai-machi (JP);
Minoru Koshimizu, Nakai-machi (JP);
Haruo Harada, Nakai-machi (JP);
Hiroshi Arisawa, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/472,781

(22) Filed: Dec. 28, 1999

(30) Foreign Application Priority Data

Jan. 20, 1999 (JP) ............................. 11-012193

(51) Int. Cl.[7] ............................. H04N 15/00
(52) U.S. Cl. ......................... 345/97; 345/81; 345/204; 345/206; 430/1; 430/2; 430/290; 358/471; 359/48; 359/72
(58) Field of Search ............... 345/97, 81, 204, 345/206; 430/1, 2, 290; 358/471; 359/72, 48

(56) References Cited

U.S. PATENT DOCUMENTS

| | | | | |
|---|---|---|---|---|
| 5,112,710 A | * | 5/1992 | Shimura et al. ............... 430/46 |
| 5,131,377 A | * | 7/1992 | Taruya et al. ................. 123/613 |
| 5,313,321 A | * | 5/1994 | Yamamoto ..................... 359/77 |
| 5,394,225 A | * | 2/1995 | Prker .......................... 355/259 |
| 5,408,341 A | * | 4/1995 | Takanashi et al. .......... 358/471 |
| 5,536,933 A | * | 7/1996 | Izumi et al. .............. 250/208.2 |
| 5,740,494 A | * | 4/1998 | Shoji et al. ................... 399/71 |
| 5,800,950 A | * | 9/1998 | Hiraro et al. .................. 430/1 |
| 5,864,166 A | * | 1/1999 | Stoudt ......................... 257/431 |
| 5,900,767 A | * | 5/1999 | Bird et al. ................... 327/407 |
| 5,985,499 A | * | 11/1999 | Guth et al. .................... 430/42 |
| 6,133,894 A | * | 10/2000 | Yagyu ........................... 345/89 |
| 6,239,514 B1 | * | 5/2001 | Isberg et al. ................ 307/116 |
| 6,266,039 B1 | * | 7/2001 | Aoki ............................. 345/94 |
| 6,333,439 B1 | * | 12/2001 | Shimada ..................... 568/931 |

OTHER PUBLICATIONS

S. Fukushima, *Liquid Crystal Spatial Optical Modulator and Optical Information Processing*, EKISHO, (Liquid Crystal), vol. 2, No. 1, 1998, pp. 3–11.

H. Yoshida et al,. *Reflective Display with Photoconductive Layer and a Bistable, Reflective Cholesteric Mixture*, SID 96 Applications Digest, pp. 59–62.

*Optical Information Processing*, The Japan Society of Applied Physics, pp. 171–173.

* cited by examiner

Primary Examiner—Richard Hjerpe
Assistant Examiner—Abbas Abdulselam
(74) Attorney, Agent, or Firm—Oliff & Berridge, PLC

(57) ABSTRACT

The invention provides a photoconductive switching element used for light switching of a functional element driven by an AC electric field or AC current which are highly functional and inexpensive and provides a device in which such a photoconductive switching element and a functional element such as a liquid display element are combined and incorporated, and an apparatus, a recording apparatus, and a recording method which are provided with the above-mentioned device. The photoconductive switching element has at least a light transmissible electrode layer, a charge generation layer, a charge transfer layer, and a charge generation layer laminated in this order on a light transmissible substrate. The photoconductive switching element is combined with a functional element to form a device of the present invention, and the device is incorporated in an apparatus or a recording apparatus to fabricate an apparatus or a recording apparatus respectively of the present invention. In the recording method of the present invention, such a recording apparatus is used.

24 Claims, 17 Drawing Sheets

LIGHT

WHEN IMPEDANCE IS MATCHING

WHEN IMPEDANCE IS NOT MATCHING

PHOTOCONDUCTIVE SWITCHING ELEMENT, DEVICE USING IT, AND APPARATUS, RECORDING APPARATUS, AND RECORDING METHOD IN WHICH THE DEVICE IS INCORPORATED

BACKGROUND OF THE INVENTION

1. Field of the Invention

This invention relates to a light switching element which uses an organic photoconductor, and a device, an apparatus, a recording apparatus, and a recording method which uses the light switching element.

2. Description of the Related Art

Recently, an optically writable space modulation device which is a combination of a photoconductive switching element and a functional element such as a display element has been developed, and has been practically used for a projector as a light valve, and the possibility of application in the optical information process has been studied as described in "Liquid Crystal Space Modulator", Liquid Crystal, Vol. 2, No. 1, 1998, pp 3–18.

In an optically writable space modulation device, the impedance of a photoconductive switching element is varied depending on the quantity of received light while a predetermined voltage is being applied on the element, the voltage applied on a display element is controlled to drive the display element, and an image is thereby displayed.

As the element for controlling the voltage or current by means of the quantity of received light, for example, the photo-diode used for CCD, a-Si used for contact type image sensors, and organic photoconductor have been researched and developed. Particularly, the organic photoconductor (OPC) is practically used for electrophotographic sensitive materials and solar cells because of small dark current, inexpensive material cost, and high productivity due to easy manufacturing, and also it is expected that the organic photoconductor is applied to a photoconductive switching element for the same reason.

OPC which has been proposed and used practically as an electrophotographic sensitive material has the structure as shown in FIG. 27 generally. An OPC layer having two layer structure of an charge generation layer 51 (CGL) and a charge transfer layer 52 (CTL) is provided on the surface of a conductive substrate 50. Ions are charged on the surface, and when a light is irradiated thereafter onto the surface, the ion charge disappears on the area where the light has been irradiated and on the other hand the ion charge remains on the area where the light has not been irradiated, that is the OPC functions as a light switching element. The mechanism which is involved in ion charge disappearance on the area where the light has been irradiated is described hereunder. When the charge generation layer 51 receives a light, the charge generation layer 51 generates carriers and electrons in the layer depending on the wavelength and the quantity of the light, and generates the charge. Generated electrons or carriers are transferred up to the surface through the charge transfer layer 52, and cancel the ion charge on the surface. As the result, the charge on the area where the light has been irradiated is discharged and the charge on the area where the light has not been irradiated remains. Afterwards, charged toner is adhered on the area where the charge remains, the toner is transferred onto a paper and fixed to obtain a printed image. The reason why the charge transfer layer is needed is that the withstand voltage of the charge generation layer is low. The charge transfer layer is necessary to improve the withstand voltage of the OPC used as a light switch.

The structure applied to a solar cell is, for example, shown in FIG. 28. In FIG. 28, a transparent substrate 60, a semi-transparent conductive film 61 made of a metal such as Al, an n-type inorganic photoconductive layer 62 made of a material such as SiO or ZnO, a p-type organic photoconductive layer 63 made of a material such as X-type non-metal phthalocyanine, and an electrode 64 are laminated in the order as described from the bottom. When a photon is incident onto a solar cell, a potential difference is caused at the interface between the n-type layer and the p-type layer, and the potential difference is utilized. In this case, the high withstand voltage is not necessary, and a charge transfer layer is not needed.

However, the organic photoconductive switching element is disadvantageous as described hereunder. In detail, the rectification function of the organic photoconductive switching element is a disadvantage. Usually, any one of electron and carrier is involved in transfer through a charge transfer layer. The reason is that an electron attractive material or an electron donative material is used as the charge transfer layer material. Though some materials such as polycarbazole can: be involved in bipolar transfer, the sensitivity is poor and such a material has not been used practically.

Because of this reason, the organic photoconductive cannot be applied to, for example, a image display apparatus in which a liquid crystal element is incorporated combinedly or an optically writable space modulation element. The reason in that the applied voltage is increased and the baking of an image is caused concomitantly. In detail, when a voltage is applied on OPC which has rectification function, the time during which an electric field is applied to a liquid crystal effectively is reduced because the positive and negative bipolar voltage application is difficult. Therefore, to control the orientation of the liquid crystal, it is required to apply a higher voltage or to apply a voltage for a longer time.

Because of the rectification function, the electric filled of one polarity cannot be applied and a DC bias is applied to the liquid crystal equivalently in the effect, ions in the liquid crystal are transferred to the place near the electrode because of the bias, the switching becomes difficult due to the electric field which ions generate, and the image baking occurs. To prevent the image baking due to transfer of ions in the liquid crystal, usually positive and negative alternate electric field is applied.

It is difficult to use not only the liquid crystal but also OPC having the conventional structure for switching of an element to which a DC bias component should not be applied effectively.

Because of this difficulty, a-Si is used as an photoconductive switching element for an light switching type image display apparatus having the liquid crystal as described in a literature "Reflective Display with photoconductive Layer and a Bistable, Reflective Cholesteric Mixture" by H. Yoshida and T. Takizawa, SID 1996 APPLICATIONS DIGEST pp 59. a-Si is capable of bipolar charge generation and transfer, but a-Si is disadvantageous as described hereunder. The sophisticated film forming technique is required, and it is required to heat a substrate at a temperature higher than 200 degrees usually in the fabrication process, in which plasma CVD is employed usually, to result in difficult practical application to a plastic substrate, the production cost is high, and the process control is difficult, as the result a-Si is not practically used. Other photo-sensitive material such as Se or CdS may be likely alternative for a-Si, but these materials are very hazardous for the environment and human body.

SUMMARY OF THE INVENTION

The present invention was accomplished to solve the above-mentioned problem, and provides a high performance inexpensive photoconductive switching element used for light switching of a functional element driven by means of AC electric field or AC current, and also provides a device in which a photoconductive switching element and a functional element such as liquid crystal display element are combined, an apparatus, an recording apparatus, and a recording method in which the device is incorporated.

The photoconductive switching element switches a functional element driven by an AC electric field or AC current. The photoconductive switching element ha s at least a light transmissible electrode layer, a charge generation layer, a charge transfer layer, and charge generation layers. The layers are laminated in this order on a light transmissible substrate.

The photoconductive switching element of the present invention has two charge generation layers with interposition of a charge transfer layer, so the response signal with respect to the 0 V line obtained is close to symmetrical when an AC electric field is applied.

A photoconductive switching element in which charge generation material and charge transfer material are mixed at the interface between the charge generation layer and the charge transfer layer, and the mixing ratio changes continuously in the lamination direction of the layer is advantageous in performance. It is advantageous to use a plastic substrate, and organic material for forming the charge generation layer and charge transfer layer.

The present invention also provides a device in which the photoconductive switching element is connected electrically to a functional element the photoconductive switching element may be combined with the functional element in a piece.

If the functional element shows a memory characteristic, or is a display element, a display element showing a memory characteristic, a liquid crystal display element, a bistable liquid crystal display element, or cholesteric liquid crystal display element, the device of the present invention functions effectively.

The connection between the photoconductive switching element and a functional element is stabilized by combining these elements in a piece. Particularly, a device fabricated by combining the functional element showing the memory characteristic with a photoconductive switching element in a piece is detachable from the apparatus body which drives the device, and the separated device can be distributed.

The present invention also provides a device fabricated by successively laminating the photoconductive switching element, a functional film for removing the DC component, and a functional element such as a display element combined in a piece.

Because the functional film for removing the DC component is provided in the device of the present invention, the symmetry with respect to the above-mentioned 0 V line is further improved.

Also, the functional film for removing the DC component has a capacitance larger than that of the display element; therefore, the device functions effectively.

A device having a functional film for removing the DC component mainly made of an organic material selected from a group of polyvinylalcohol (PVA), polyvinylcarbazole, polyvinylacetate, polyethyleneoxide, and polybutylalcohol, or an inorganic material selected from a group of Si—O, Ti—O, Al—O, Si—N, PZT, Ta—O, and Al—N functions still more effectively.

The present invention also provides an apparatus including a device having the photoconductive switching element and any of a functional element showing a memory characteristic, a display element, display element showing a memory characteristic, a liquid crystal display element, a bistable liquid crystal display element, and cholesteric liquid crystal display element combined in a piece, and a driving mechanism connected electrically to the device, and this driving mechanism is detachable from the device.

Because the apparatus includes the device having the photoconductive switching element and the functional device and the driving mechanism which is detachable from the device, the device is detachable from the body for driving the device, and the separated device can be distributed.

The present invention provides an apparatus having the device fabricated by laminating the switching element, the functional film and the functional element, and the driving mechanism connected electrically to the device. The driving mechanism is detachable from the device.

The present invention also provides a recording apparatus including a device having the photoconductive switching element and the display element combined in a piece, a light writing unit for emitting a light onto the photoconductive switching element, and a pulse input unit for applying the positive pulse and the negative pulse on the device as the driving pulse for driving the device.

Because the photoconductive switching element is used in the recording apparatus, the high reflectance is obtained when an AC electric field is applied for driving.

The pulse input unit of the above-mentioned recording apparatus preferably applies a negative pulse as the final pulse, and a positive pulse as the first pulse, or applies a positive pulse as the first pulse and a negative pulse as the final pulse. In this context, the negative pulse means a pulse which is applied so that the voltage of the electrode on the display element side is higher than that of the electrode of the photoconductive switching element side of the device. On the other hand, the positive pulse means a pulse which is applied so that the voltage of the electrode of the photoconductive switching element side is higher than that of the electrode on the display element side of the device. The device is preferably provided with a functional film for removing the DC component additionally in this recording apparatus. Furthermore, in this recording apparatus, it is preferable that a cholesteric liquid crystal element is used as the display element, and a pulse input unit for applying final pulse of negative polarity is used as the pulse application unit (regardless of the polarity of the first pulse).

The present invention also provides a recording method in which the recording apparatus is used. In the recording method, the positive pulse and the negative pulse are applied to the device as the driving pulse for driving the device, a light is incident onto the photoconductive switching element for light writing, and a negative pulse is applied as the final pulse, a positive pulse is applied as the first pulse, or a positive pulse and a negative pulse are applied respectively as the first pulse and the final pulse.

In the recording apparatus and the recording method, because the negative pulse is applied as the final pulse (regardless of the polarity of the first pulse), the display element is turned on effectively in the case where a display element which requires a sharp voltage drop when a voltage is turned off such as a cholesteric liquid crystal display element is used.

Further, in the recording apparatus and the recording method, because the positive pulse is applied as the first pulse, an excellent modulation effect is obtained without adverse effect due to the time constant of a photoconductive switching element and a display element.

BRIEF DESCRIPTION OF THE DRAWINGS

Preferred embodiments of the present invention will be described in detail based on the following figures, wherein:

FIG. 10A shows the case where the final pulse is a negative pulse and FIG. 10B shows the case where the final pulse is a positive pulse;

DETAILED DESCRIPTION OF THE PREFERRED EMBODIMENTS

An photoconductive switching element of the present invention basically has a light transmissible substrate, a light transmissible electrode, a bottom charge generation layer, a charge transfer layer, and a top charge generation layer, and is characterized by having two charge generation layers with interposition of a charge transfer layer. (hereinafter, the property "light transmissible" is represented by "transparent" depending on the case).

Figure 1:
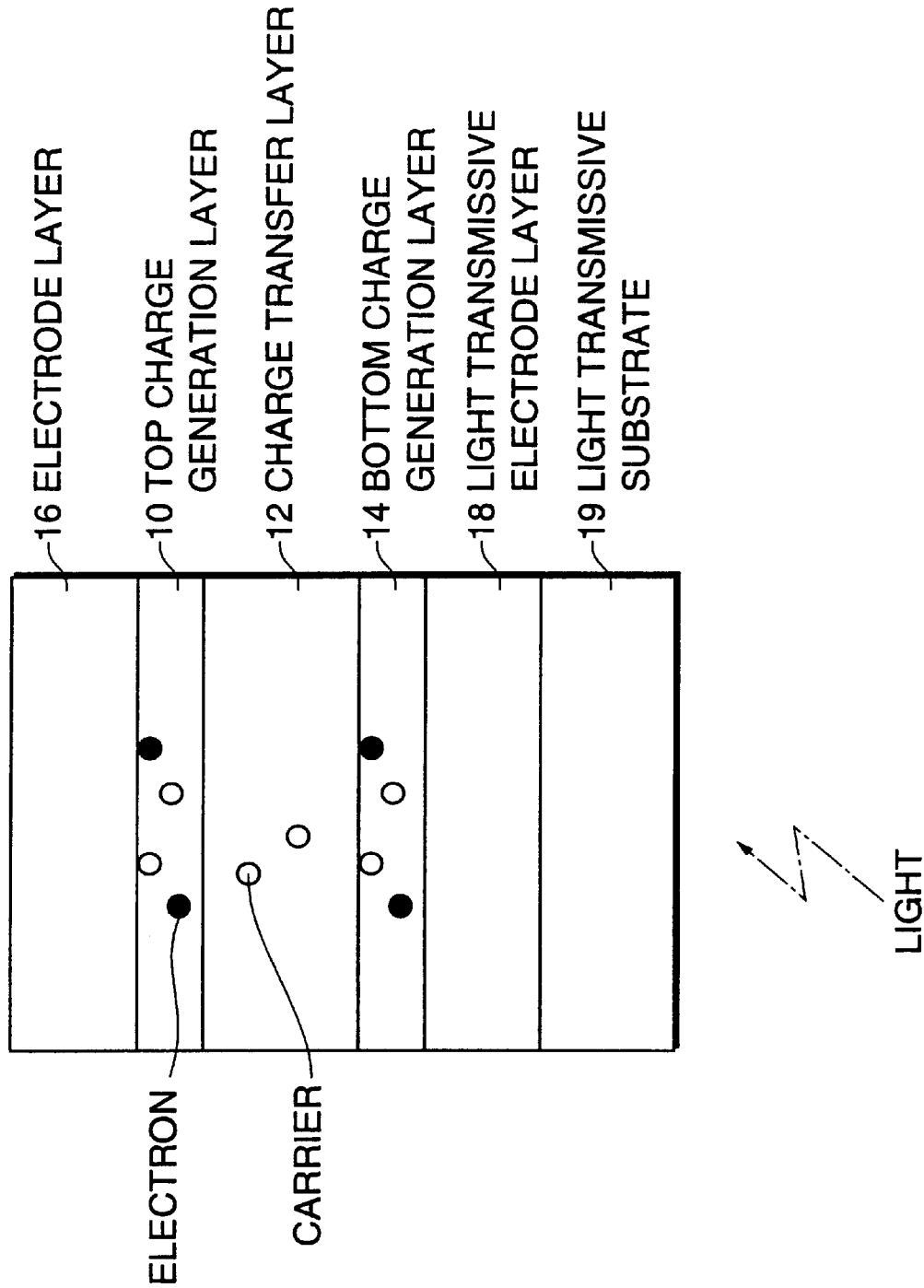
FIG. 1 is a schematic diagram for illustrating the laminated structure of a photoconductive switching element of the present invention.

A photoconductive switching element of the present invention will be described with reference to FIG. 1. FIG. 1 shows the structure of a photoconductive switching element (an organic photoconductive switching element having the dual CGL structure) of the present invention and carriers and electrons which are generated when a light is irradiated onto the photoconductive switching element. In the drawing, 10 denotes the top charge generation layer (top CGL), 12 denotes the charge transfer layer, 14 denotes the bottom charge generation layer (tail CGL), 18 denotes the light transmissible electrode, and 19 denotes the light transmissible substrate, the photoconductive switching element of the present invention basically has these components. In addition, 16 denotes an electrode layer formed on the top charge generation layer of the photoconductive switching element of the present invention.

When a light is irradiated, carriers and free electrons are generated in the top charge generation layer 10 and the bottom charge generation layer 14, and if an electric field is applied so that the above-mentioned electrode layer 16 functions as the positive electrode and the electrode layer 18 functions as the negative electrode, then carriers generated in the top charge generation layer 10 is injected into the charge transfer layer 12 and free electrons enter the electrode 18 simultaneously. Carriers transferred to the charge transfer layer 12 combine with electrons generated in the bottom charge generation layer 14, carriers generated in the bottom charge generation layer are injected into the electrode 16. As the result, a current flows. In the case where an inverted electric field is applied, a current flows in the reverse direction. Therefore, the photoconductive switching element having this structure is driven by AC electric field or AC current.

In the charge transfer layer of the photoconductive switching element of the present invention, a photoconductive switching element having a layer formed by mixing a charge generation material and a charge transfer material at the interface between the above-mentioned charge generation layer and charge transfer layer in which the mixing ratio of both materials vary continuously in the lamination direction of each layer is advantageous in that the adhesion between the charge generation layer and the charge transfer layer as well as the reliability of the photoconductive switching element are very high. The term "the mixing ratio of both materials vary continuously" means the structure of the photoconductive switching element described hereunder. For example, M denotes the composition of the top and bottom charge generation layer material and M' denotes the composition of the charge transfer layer material. bottom charge generation layer M/bottom interface layer xM-(1-x)M'/charge transfer layer M'/top interface layer (1-y)M'+yM/top charge generation layer M wherein 1>x>0 and 1>y>0, x varies in the direction from 1 to 0 in the bottom interface layer from the bottom charge generation layer to the charge transfer layer, and y varies in the direction from 0 to 1 in the top interface layer from the charge transfer layer to the top charge generation layer.

Because the composition of the charge generation materials and the charge transfer material varies as described hereinabove, the adhesion between the charge generation layers and the charge transfer layer is improved.

The structures of respective layers of the photoconductive switching element of the present invention will be described successively hereunder.

First as the light transmissible substrate used for the photoconductive switching element of the present invention, a substrate made of materials such as glass, PET (polyethyleneterephthalate), PC (polycarbonate), polyethylene, polystyrene, polyimide, or PES (polyether sulfone) is used. It is advantageous that a light transmissible plastic substrate is used from the view point of the flexibility of the substrate, easy molding, and inexpensive cost.

As the transmissible electrode layer of the present invention, an ITO film, Au film, $SnO_2$ film, Al film, or Cu film is used.

Next, the material used for the top charge generation layer and bottom charge generation layer of the photoconductive switching element of the present invention is described. An organic material which generates charge when a light is irradiated such as perylene base material, phthalocyanine base material, bis-azo base material, dithioketo diphenyl pyrrolo pyrrole base material, squarylium base material, azulenium base material, thiapyrylium base material, or polycarbonate base material is used preferably.

Because it is required for the top charge generation layer (10) and the bottom charge generation layer (14) to generate free electrons in approximately the same quantity, approximately the same sensitivity to the wavelength, light quantity, and voltage is required, the same material is used for both layers preferably, but different materials may be used as long as these materials have the approximately same sensitivity. An optical conductive switching element consisting of the top and bottom charge generation materials different from each other in the sensitivity generates the waveform having considerable asymmetry with respect to 0 V line described hereinafter when an AC electric field is applied under light irradiation.

The charge generation layer is formed by means of dry film forming process such as vacuum deposition or spattering, or may be formed by means of a spin coating process in which a solution or dispersion is used or a dipping process. In any process, heating of a substrate and strict process control, which are required for a-Si or photo diode forming, are not required.

The film thickness of the top and bottom charge generation layer is preferably 10 nm to 1 $\mu$m, preferably 20 nm to 500 nm. The film thickness thinner than 10 nm results in insufficient optical sensitivity and difficulty in forming of an even film, and on the other hand, the film thickness thicker than 1 $\mu$m results in saturated optical sensitivity and delamination of layers due to inter-film stress.

As the charge transfer material which constitutes the charge transfer layer, a trinitro-fluorene base material, a polyvinylcarbazole base material, an oxadiazole base material, a hydrazine base material, a stilbene base material, a triphenylamine base material, a triphenylmethane base material, or a diamine base material may be used. An ion conductive material such as polyvinylalcohol and ethylene oxide which contain $LiClO_4$ may be used. Among these materials, particularly the diamine base material is used preferably from the view point of the sensitivity and carrier transfer capability.

As a process for forming the charge transfer layer, a dry film forming process such as vacuum deposition or spattering, or a spin coating process or a dipping process in which a solution or dispersion is used may be used.

The thickness of the charge transfer layer is 0.1 $\mu$m to 100 $\mu$m, preferably 1 $\mu$m to 10 $\mu$m. The thickness thinner than 0.1 $\mu$m results in reduced with stand voltage and poor reliability, and on the other hand, the thickness thicker than 100 $\mu$m results in difficulty of impedance matching between the functional element and the charge transfer layer, and the above-mentioned range is therefore preferable.

Figure 2:
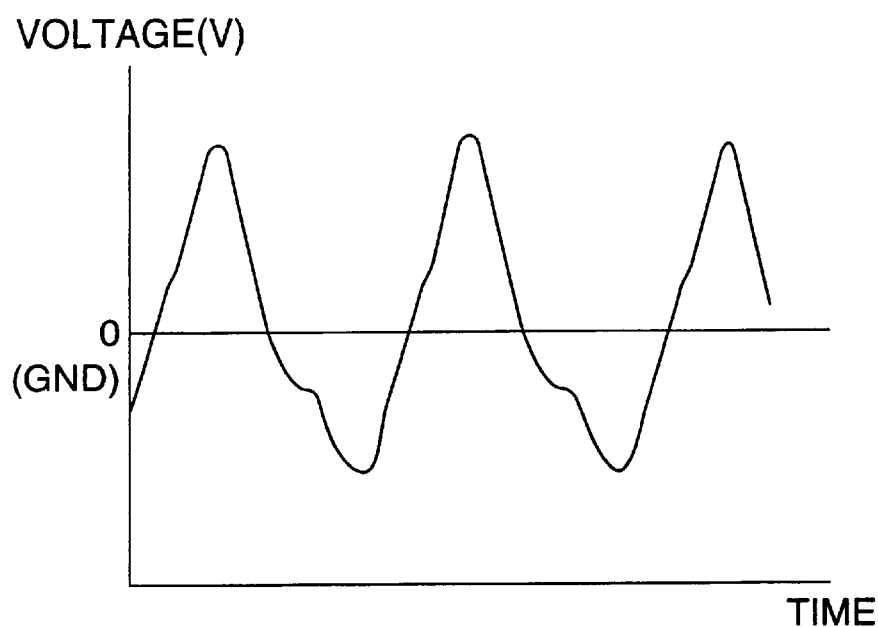
FIG. 2 is a graph for showing the response waveform obtained when the AC sine wave is applied under light irradiation to a cell of the photoconductive switching element of the first embodiment.
Figure 3:
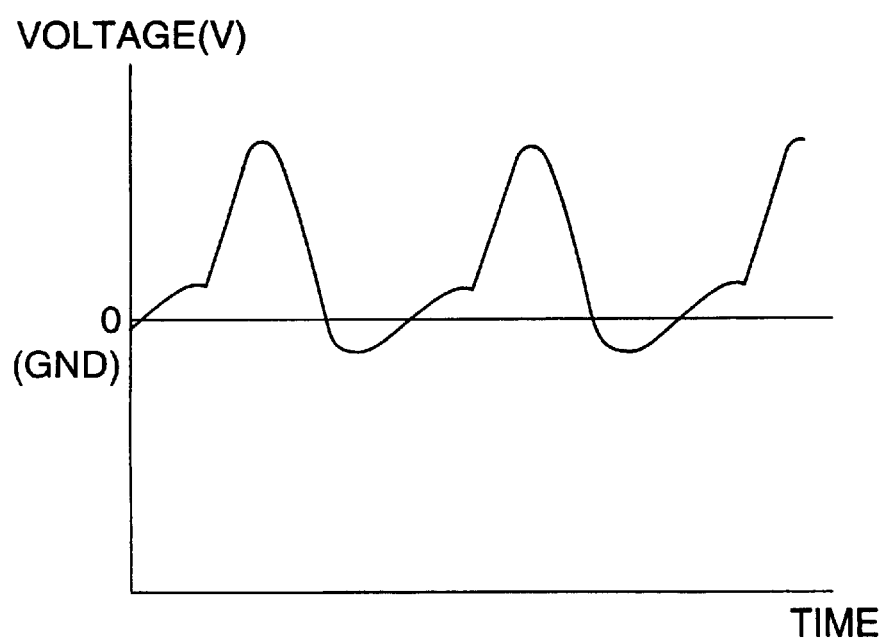
FIG. 3 is a graph for showing the response waveform obtained when the AC sine wave is applied under light irradiation to a cell of the photoconductive switching element of Comparative Example 1.

The excellence in voltage symmetry of the photoconductive switching element of the present invention will be described with reference to drawings though it will be described also in examples. FIG. 2 is a diagram for showing the voltage between both ends of a resistor when an AC sine wave is applied under irradiation with a light to an photoconductive switching element of the present invention formed by a method in which a transparent electrode layer is provided on a transparent substrate, on the transparent electrode a bottom charge generation layer, a charge transfer layer, and top charge generation layer are provided successively from the bottom, on which photoconductive switching element an electrode connected to another electrode with interposition of the resister is provided additionally. On the other hand, FIG. 3 is a diagram for showing the voltage obtained in the same manner as described hereinabove excepting that an optical conductor switching element which is formed by removing the top charge generation layer from the photoconductive switching element described in relation to FIG. 2 is used. As obvious in comparison between FIG. 2 and FIG. 3, the voltage symmetry with respect to 0 V line in the case of the photoconductive switching element of the present invention is excellent compared with that in the case of the conventional photoconductive switching element.

In the case where a photoconductive switching element which is poor in the voltage symmetry is used as a switching element for driving, for example, a display element, even if a sufficient voltage is applied on one polarity of the display element while a light is being irradiated, a sufficient voltage application is not obtained on the opposite polarity, and as the result a desired display image cannot be obtained.

For example, when a voltage higher than the threshold voltage is applied to a liquid crystal element which is served as a display element to obtained a high reflectance, even if a sufficient voltage is applied on one polarity to obtain a high reflectance, a sufficient voltage cannot be obtained after polarity inversion, the reflectance of the liquid crystal becomes low, and a predetermined high reflectance is not obtained. Furthermore, the threshold characteristic namely sharpness of the reflectance change to the applied voltage can be deteriorated. In this case, for example, the edge of an image bleeds in writing to cause deterioration of the resolution. This state is equivalent to that in which a DC bias is applied effectively, for example, ions are attracted to one polarity in the liquid crystal and as the result "image baking", that means impossible rewriting, is caused.

To avoid this problem, for example, though a method in which a higher voltage is applied so that applied voltage on both polarities of the display element is sufficient could be an alternative, in this case, the more higher voltage is additionally applied to the polarity where a sufficient voltage has already been applied, the reliability of the device becomes poor and the power consumption increases, and such a situation is not preferable from the view point of the withstand voltage.

Figure 4:
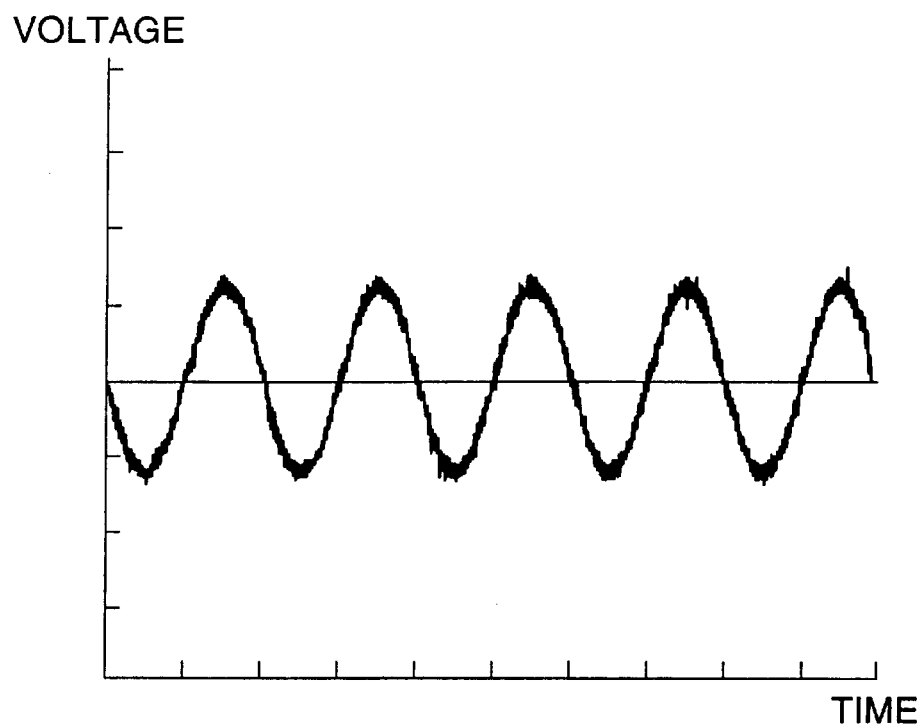
FIG. 4 is a graph for showing the response waveform obtained when the AC sine wave is applied under no light irradiation to a cell of the photoconductive switching element of the present invention.
Figure 6:
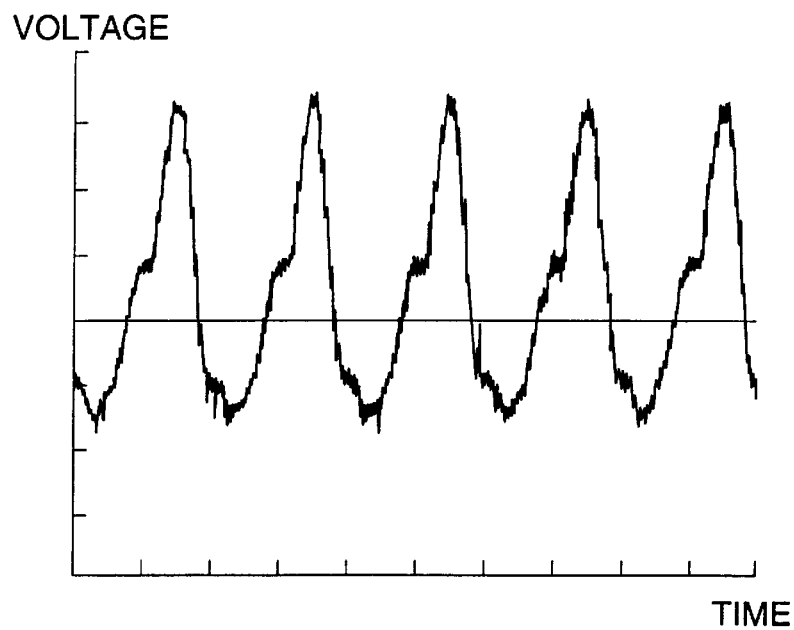
FIG. 6 is a graph for showing the response waveform obtained when the AC sine wave is applied under light irradiation to a photoconductive switching element of the present invention (a functional film for removing the DC component is not provided)

As described hereinabove, the voltage symmetry of the photoconductive switching element of the present invention having two charge generation layer is excellent compared with the conventional photoconductive switching element, but even though the quite same material is used for the top charge generation layer and the bottom charge generation layer, the voltages which are taken out when an AC electric field is applied under irradiation of a light are not necessarily symmetrical. In other words, even though the same charge generation material is used for both the top and bottom charge generation layers, the same photoconductive characteristic is not obtained. The voltage change taken out when an AC electric field is applied under non-irradiation of a light is not shown in FIG. 4, in this case, the asymmetry is not caused. On the other hand, FIG. 6 shows that the voltage (for example, voltage applied to a display element) taken out from the positive polarity and negative polarity when an AC electric field is applied under irradiation of a light is asymmetrical with respect to positive and negative polarity.

The reason why the photoconductive switching element having the dual CGL structure as described hereinabove is estimated as described hereunder. In detail, in the case of a dual CGL structure having two top and bottom charge generation layers with interposition of a charge transfer layer, the light absorption quantity in the charge generation layer on the side opposite to the light incident side or substrate side is lower than that of the charge generation layer formed on the light incident side. After the light incidence, because a residual light which is reduced from the original light correspondingly to absorption in the charge generation layer on the substrate side reaches to the charge generation layer on the opposite side, the light absorption quantity in the charge generation layer on the substrate side is not the same as the light absorption quantity in the charge generation layer on the opposite side to cause the asymmetry. Further, the charge generation layer formed on the charge transfer layer is usually likely to be less photosensitive than the charge generation layer formed on the transparent electrode on the light incident substrate or the charge generation layer formed on the transparent electrode as a functional film with interposition of an adhesive layer.

Accordingly, as described hereinafter, a functional element, for example, a display element, is laminated on the photoconductive switching element of the present invention to constitute a device, the charge tends to flow from the light incident side to the functional element side for the above-mentioned reason and does not tend to flow from the functional element side to the substrate side. In detail, in the case where the potential of the electrode on the light incident side increases higher than that of the electrode on the functional element side, a current tends to flow from the light incident side to the functional element side, and the resistance of photo conductive switching is further lowered. On the other hand, in the case where the potential of the electrode on the functional element side increases higher than that of the electrode on the light incident side, a current does not tend to flow from the functional element side to the light incident side, and the resistance of photoconductive switching becomes larger.

In the present invention, it was found that, in the case where the photoconductive characteristic of charge generation layers formed on the top and bottom of the charge transfer layer of the photoconductive switching element described hereinabove was not the same, a functional film having capacitance component which was capable of removing a DC component, namely a functional film for removing the DC component provided in the photoconductive switching element, was effective to remove the DC bias effectively and to improve the above-mentioned voltage symmetry. The functional film for removing the DC component is described in detail hereunder.

An evaluation experiment was carried out to observe the effect obtained when the capacitance DC voltage namely the characteristic of the functional film for removing the DC component was applied.

Because it is actually difficult to measure the waveform of each functional component member in a device having a liquid crystal display unit, an experimental cell was fabricated as described hereunder.

First, a benzimidazole perylene film having a thickness of 0.08 $\mu$m was formed as a bottom charge generation layer on a glass substrate (product of DOW CORNING: 7059) with an ITO film by means of vacuum deposition, next a film having a dry thickness of 3 $\mu$m was formed by coating a solution obtained by diluting an original solution with mono-chloro benzene to ½ concentration of the original solution consisting of 7.2% by weight of biphenyldiamine base material (3,3'-dimethyl-N, N'-bis (4-ehtylphenyl)-N, N'-bis (4-methylphenyl)-[1,1'biphenyl]-4,4'-diamine) 10.8% by weight of polycarbonate-Z (bisphenol(Z) polycarbonate) and 82% by weight of monochlorobenzene by means of spin coat process as a charge transfer layer. In addition, a BZP layer having a thickness of 0.08 $\mu$m was formed as a top charge generation layer. An Au electrode was formed on the top charge generation layer, and a capacitor of 5nF/cm$^2$ was connected as the alternate to the functional film for removing the DC component, and thus an experimental cell was obtained. The surface area of the cell was 1 cm$^2$. The capacitance component of the liquid crystal of 2nF was obtained by measuring by means of an impedance analyzer (product of Solartron, MAP-1260).

To observe the waveform, a 1 M$\Omega$ resistor was connected in series to the fabricated experimental cell, and an AC sine wave of 25 Hz 140 Vpp was applied under irradiation of a 130 mW halogen light, and the voltage between both ends of the resistor was observed. The result is shown in FIG. 5.

Another experimental cell was fabricated in the same manner as described hereinabove excepting that the 5nF capacitor was not provided as a model not having the functional film. A 1 MΩ resistor was connected directly to this experimental cell, and the waveform was checked in the same manner as described hereinabove. The waveform and the frequency were the same but the applied voltage was 100 Vpp. The result is shown in FIG. 6 described hereinbefore.

Figure 5:
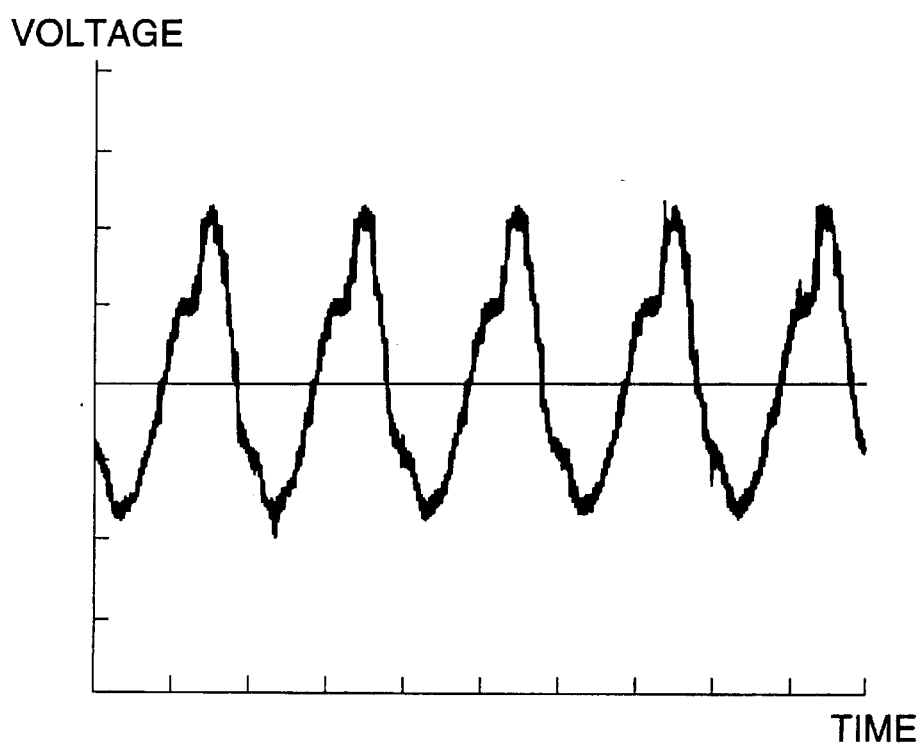
FIG. 5 is a graph for showing the response waveform obtained when the AC sine wave is applied under light irradiation to a photoconductive switching element of the present invention to which a capacitor is connected.

It is obvious in the comparison between FIG. 5 and FIG. 6 that the former in which the capacitor is connected is superior to the latter in the symmetry with respect to 0 V line, and it is recognizable that the characteristic of the functional film for removing the DC component of the present invention is very important.

In the present invention, it is possible that a functional film for removing the DC component is formed on the top charge generation layer of the above-mentioned photoconductive switching element to form another embodiment of the photoconductive switching element.

For example, organic material such as polyvinylalcohol (PVA), polyvinylcarbazole, polyvinylacetate, polyethyleneoxide, or polybutylalcohol is suitably used for the present invention as a material used for the functional film for removing the DC component having a capacitance component because the above-mentioned functional film is formed easily, and materials other than these ones are also usable as long as the material is an insulator. For example, polyolefin, polystyrene, polyacetylene, polyvinylester, polyvinylether, polyether, polyester, polyacetal, polycarbonate, polyamine, polyamide, polypeptide, polyurethane, polyurea, polyimide, polyimidazole, polyoxazole, polypyrrole, polyaniline, polysulfide, polysulfone, polysiloxane, polysilane, polyphosphoric acid, polyphosphine, polyphosphineoxide, polyphosphinate, polyphosphonate, polyphosphate, polyphosphazene, phenol resin, urea resin, melamine resin, epoxy resin, or alkyd resin may be used. As the method for forming the above-mentioned functional film, a known process such as spin coating or roll coating may be employed effectively.

As the inorganic material, Si—O, Ti—O, Al—O, Si—N, PZT, Ta—O, or Al—N may be used suitably in the present invention because the above-mentioned functional film is easily formed, and other inorganic materials having high insulating property such as oxides, nitrides, and carbides may be used as long as the inorganic material is an dielectric material. For example, Bi—O, Ca—O, Fe—O, Zn—S, W—O, Ta—O, Mg—O, Y—O, Hf—O, Zr—O, Li—Ti—O, La—Ti—O, Ca—V—O, Sr—Cr—O, or Sr—Ti—O may be used.

As the method for forming the above-mentioned functional film made of these materials, a known process such as vacuum deposition, spattering, or CVD may be employed. The resistance of 1 MΩ/cm$^2$ or higher is desirable for a thin film when the thin film is formed for insulation.

The above-mentioned organic material and the inorganic material may be used combinedly for forming the above-mentioned functional film, that is, both materials may be blended or laminated for forming the above-mentioned functional film.

The characteristic required for the functional film for removing the DC component of the present invention is high insulation and capacitance. The reason is that the impedance increases with decreasing the capacitance component because the partial pressure is caused on the functional film when a voltage is applied, and it is difficult to apply a sufficient voltage on the display element unit. On the other hand, in the case where the capacitance component of the above-mentioned functional film is larger than a certain capacitance, a good liquid crystal image can be formed without application of a voltage. Any material which has such characteristic can be used as the above-mentioned functional film, but it is desirable that the capacitance of the material is larger than that of the display element. It is obvious that even the functional film for removing the DC component having a capacitance component smaller than the capacitance component of the display element may be used in the case where a sufficient voltage can be applied. In general, the functional film for removing the DC component having a capacitance component of 0.1 to 10 nF/cm$^2$ is used.

The capacitance component value of a functional film can be controlled by adjusting the film thickness. The film thickness of a functional film made of an inorganic material ranges generally from approximately 0.1 μm to 1 μm, the film thickness of a functional film made of an organic material ranges generally from approximately 1 μm to 10 μm, and the film thickness is not limited to the above-mentioned ranges and determined depending on various conditions such as the impedance of a display element, the impedance of an photoconductive switching element, and writing frequency.

A functional layer as described hereinafter may be formed in a photoconductive switching element of the present invention. For example, a layer for preventing carriers from entering between the electrode and the charge generation layer may be formed. Furthermore, a reflection film or shading film may be formed, or a functional layer which is served for plural functions may be formed. These functional layers may be added in the range where the flow of a current is not prevented significantly.

A photoconductive switching element of the present invention may be formed so that a charge generation layer is formed between charge transfer layers to form a structure having a charge generation layer/a charge transfer layer/a charge generation layer/a charge transfer layer/and a charge generation layer.

As described hereinabove, a photoconductive switching element of the present invention is characterized in that at least a charge generation layer, a charge transfer layer, and a charge generation layer are laminated in the order as described on a substrate, materials which are used for forming these layers are not necessarily expensive and ordinary organic photoconductors (OPC) may be used, and the photoconductive switching element of the present-invention is therefore fabricated at a low cost. Because the photoconductive switching element is excellent in the voltage symmetry obtained when an AC electric field is applied, the photoconductive switching element is particularly suitable for driving (switching) an AC driving functional element such as a liquid crystal display device, which is sensitive to the DC component.

The organic photoconductive switching element connected electrically to a functional element as described hereinafter is used. The photoconductive switching element may be connected to a functional element in series or in parallel, or may be in combined series/parallel connection. Furthermore, the photoconductive switching element may be connected to other elements.

As the above-mentioned functional element, a display element such as a liquid crystal display element for displaying an image, electro-chromic element, electrophoretic element, or electric field rotation element, space modulation element, furthermore an element other than image display element such as an optical operation element, memory element used for a recording apparatus, or thermal head image recording element may be used.

The photoconductive switching element of the present invention is effectively used for switching an image display element, particularly for switching a liquid crystal display element. In the case where a liquid crystal display element is used, it is possible to use as an optical writing liquid crystal space modulation element. Particularly, because a liquid crystal display device is based on AC driving and sensitive to a DC component as described hereinabove, the photoconductive switching element of the present invention is effectively used for a liquid crystal display device. Nematic, smectic, discotic, or cholesteric liquid crystal may be used.

As a functional element of the present invention, a functional element showing a memory characteristic may be used. As a functional element, a bistable liquid crystal display element may be used among the above-mentioned liquid crystal display elements. The bistable liquid crystal display element is a liquid crystal which is characterized in that the orientation of the liquid crystal oriented by applying a voltage is maintained for a certain time period after the voltage is removed. For example, examples of bistable liquid crystal include ferroelectric liquid crystals, polymer dispersion type liquid crystal (PDLC) and chiral smectic Cphase, and cholesteric liquid crystal. The bistable liquid crystal does not need a power for maintaining image display because of the memory characteristic thereof, and a combined device is fabricated as described hereinafter and a combined device separated from the body can be used. The device is fabricated at a low cost.

Examples of display element showing a memory characteristic include electrochromic, electrophoretic element, and electric field rotation element in addition to the above-mentioned liquid crystal display.

Examples of functional element showing a memory characteristic include bistable elements for recording apparatus in which phase change materials such as GeSbTe base material and phase separation materials such as $SbO_x$ are used in addition to the above-mentioned examples. These elements can be controlled by, for example, controlling the supplied current namely Joule heat, the resistance of these element is detected for controlling.

In the present invention, in the case where a photoconductive switching element is connected to a functional element as described hereinabove, it is preferable to use a device in which these elements are combinedly incorporated. The connection between a photoconductive switching element and a functional element is stabilized by combining these elements.

Particularly, combination of a functional element showing a memory characteristic and a photoconductive switching element is effective for using. It is possible to use a combined device separately from the body which drives the device. Accordingly, it is possible to distribute devices which are separated from the body. A user can use it at any place and in any attitude.

It is possible to use the separated image display of the liquid crystal part. However, because it is difficult to connect the functional element to the organic photoconductive switching element consistently when they are connected again, combination of the functional element to the organic photoconductive switching element is effective for using.

A device fabricated by combining a bistable liquid crystal element served as the above-mentioned functional element showing a memory characteristic with a photoconductive switching element (image display medium) is particularly effective for using.

A device fabricated by combining a cholesteric liquid crystal display element with a photoconductive switching element is particularly a desirable image display medium because cholesteric liquid crystal has a high reflectance and is excellent in display performance among bistable liquid crystal elements.

Furthermore, in the present invention, a device fabricated by laminating the above-mentioned photoconductive switching element, the functional film for removing the DC component, and a functional element successively is effectively used.

Figure 7:
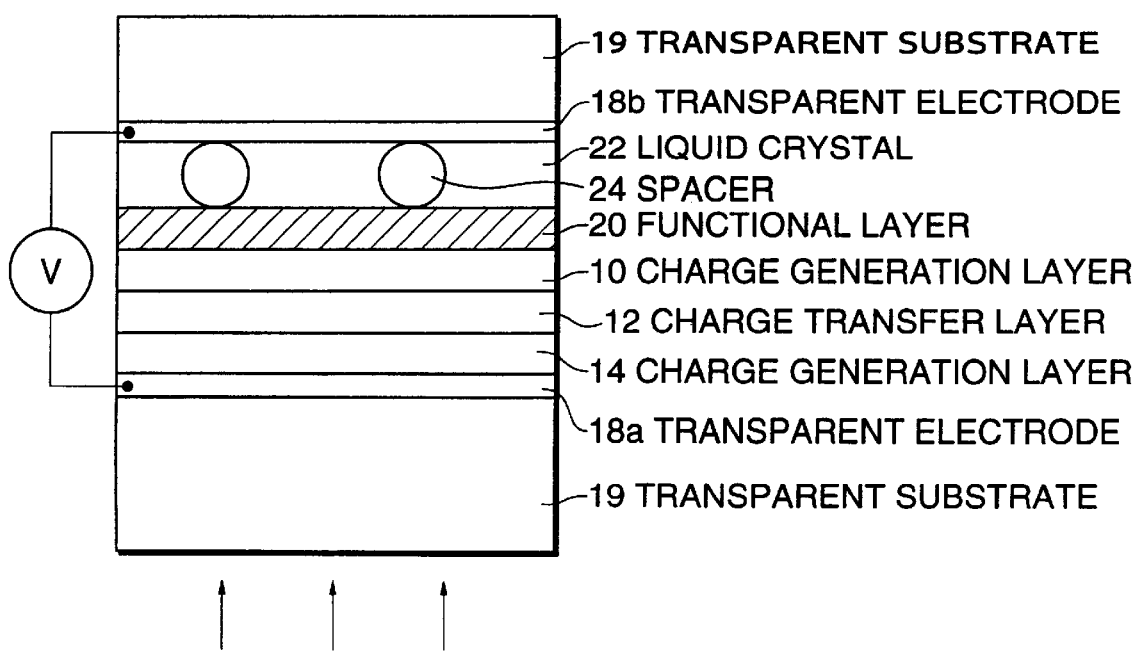
FIG. 7 is a schematic diagram for illustrating one example of a light writing modulation device provided with a photoconductive switching element of the present invention to which a functional film for removing the DC component is provided.

As an exemplary device having combined photoconductive switching element of the preset invention and a functional element, a schematic diagram of a light writing type space modulation device provided with the above-mentioned functional film for removing the DC component is shown in FIG. 7. This device is a combined liquid crystal display element having a transparent substrate 19, a transparent electrode 18a, a photoconductive switching element having a bottom charge generation layer 14, a charge transfer layer 12, and a top charge generation layer 10, a functional film for removing the DC component disposed on the photoconductive switching element as the functional layer 20, and a spacer 24, a liquid crystal 22, a transparent electrode 18b, and a transparent substrate 19 disposed on the functional layer 20 in the order from the bottom. An AC electric field is applied between the transparent electrodes 18a and 18b. A light shown with arrows is served for light writing.

In the present invention, a driving mechanism is connected electrically to a device for driving the device which has been formed by combining the photoconductive switching element as described hereinabove and a functional element to fabricate an apparatus which exhibit various functions. The device and the driving mechanism are detachably combined, then the device separated from the apparatus body can be used alone or distributed. Examples of functional element include functional element showing a memory characteristic, display element, display element showing a memory characteristic, liquid crystal element, bistable liquid crystal display element, and cholesteric liquid crystal display element, and particularly functional elements such as bistable liquid crystal display element, more particularly cholesteric liquid crystal display element are preferably used.

In the case where the device of the above-mentioned apparatus is a device having the above-mentioned functional film for removing the DC component, the voltage symmetry obtained when an AC electric field is applied is further improved.

Figure 8:
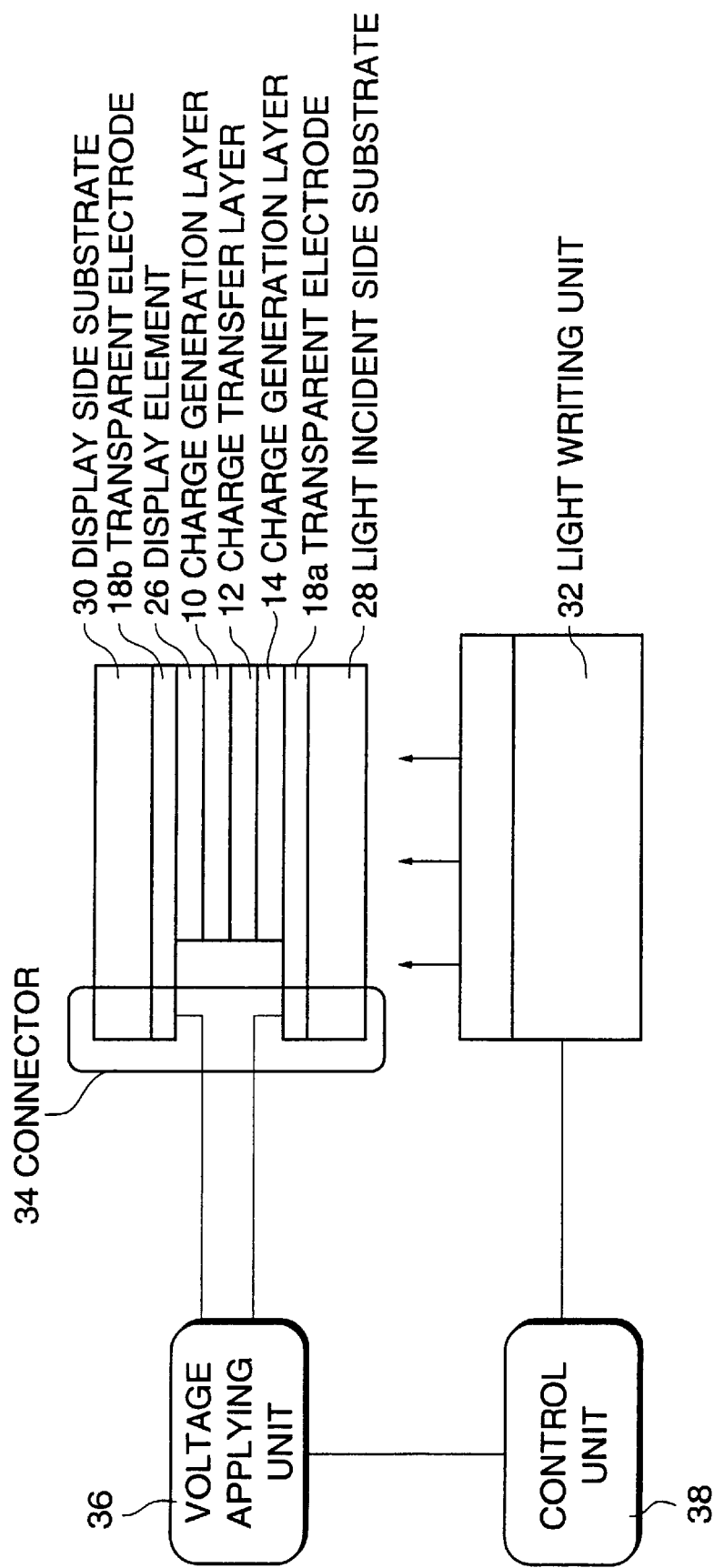
FIG. 8 is a schematic diagram for illustrating one example of a recording apparatus provided with a light writing modulation device of the present invention.

Next, a recording apparatus of the present invention is described. FIG. 8 shows a schematic diagram of an exemplary recording apparatus. The recording apparatus shown in FIG. 8 is provided with a light incident side substrate 28 formed of glass or plastic, an organic photoconductive switching element having a transparent electrode 18a, a bottom charge generation layer (CGL) 14, a charge transfer layer (CTL) 12, and a top charge generation (CGL) 10 disposed on the light incident side substrate 28, a display element 26 formed on the photoconductive switching element, a light writing space modulation device having a transparent electrode 18b and display side substrate 30, a connector 34 for connecting to the top and bottom electrodes 18a and 18b of the light writing space modulation device, a voltage applying unit 36 for applying a voltage to these electrodes, a light writing unit 32, and a control unit 38 for controlling the voltage applying unit and the light writing unit.

The connector 34 for connecting to the top and bottom electrodes of the light writing space modulation device is a connector for connecting to the light incident substrate side transparent electrode and to the display side substrate side transparent electrode, and has contact points on both sides. Of course, the connector 34 is detachable desirably.

The voltage applying unit 36 is a unit for applying a driving pulse for display synchronously with light writing by means of the light writing unit, and has an application pulse generation unit and a unit for detecting a trigger input for output. A unit having a waveform storage unit such as a ROM, a DA conversion unit, and a control unit for applying a waveform which has been read out from the ROM when a voltage is applied and has been subjected to DA conversion on the space modulation device is applicable to the pulse generation unit, and also a unit which generates the pulse by means of an electric circuit such as a pulse generation circuit instead of a ROM may be applicable to the pulse generation unit, furthermore other units may be applicable without limitation as long as the unit is a unit for applying the driving pulse.

The light writing unit 32 is provided with a unit for generating a light pattern to be irradiated onto the light incident side of the space modulation device and a light irradiation unit for irradiating the pattern onto the space modulation device. A transmission type display such as a liquid crystal display having a TFT or a simple matrix type liquid crystal display may be applied for generation of a pattern. Any light irradiation unit such as a fluorescent light, a halogen lamp, or an electroluminescence (EL) light may be used as long as the light irradiation unit is applicable for irradiation onto a space modulation device. Of course, an emission type display which is served as both pattern generation unit and light irradiation unit such as an EL display, CRT, or field emission display (FED) may be applied. In addition to the above-mentioned units, any unit other than the above-mentioned units may be used as long as the unit is used for controlling the light quantity, wavelength, and irradiation pattern to be irradiated onto a space modulation device.

The control unit 38 has a unit for converting the received image data to a display data and for controlling operation of the above-mentioned unit.

The recording apparatus of the present invention is provided with a photoconductive switching element for giving improved voltage symmetry, and thereby gives a high reflectance of a display element such as a liquid crystal display element when an AC electric field is applied.

Next, a recording apparatus and a recording method for effectively improving the performance deterioration due to an asymmetric photoconduction characteristic of a photoconductive switching element are described hereunder. As described hereinabove, though the asymmetry characteristic of voltage is significantly improved by applying a photoconductive switching element and a device in accordance with the present invention, the photoconduction asymmetry characteristic of a photoconductive switching element cannot be eliminated thoroughly. It is possible to effectively eliminate the performance deterioration due to the photoconduction asymmetry characteristic of the recording apparatus and recording method by using the recording apparatus and recording method of the present invention as described hereunder.

A method for recording in a recording apparatus provided with a space modulation device of the present invention is described.

Figure 9:
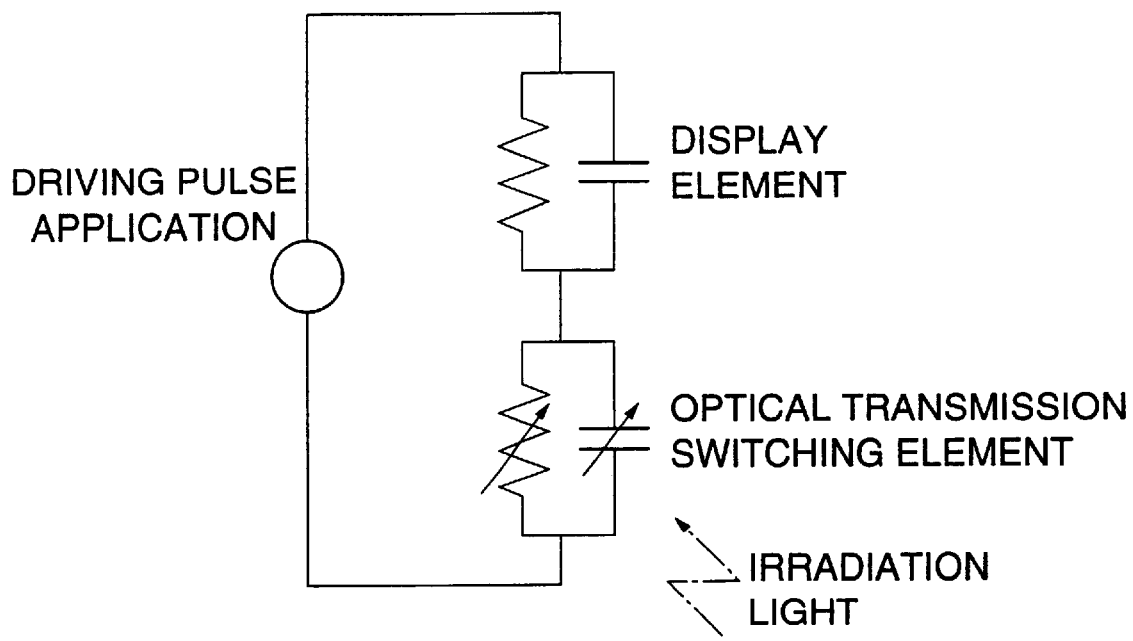
FIG. 9 is a diagram for showing an electrically equivalent circuit which is equivalent to a circuit formed by connecting a photoconductive switching element with a display element.

In a photoconductive switching element with an asymmetric characteristic, the variation magnitude of the resistance component due to photoconduction action caused when a light is irradiated depends on the voltage application direction electrically. FIG. 9 is a diagram for showing an electrical equivalent circuit which is equivalent to a circuit having a connected photoconductive switching element and a display element for describing the variation magnitude dependency.

Figure 10A:
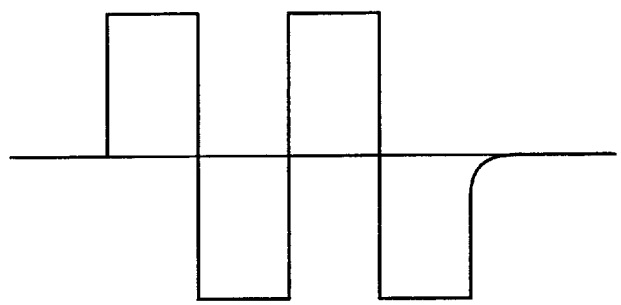
FIG. 10A and FIG. 10B are schematic graphs for showing the falling down voltage after the final pulse is turned off when a pulse voltage is applied to a photoconductive switching element.
Figure 10B:
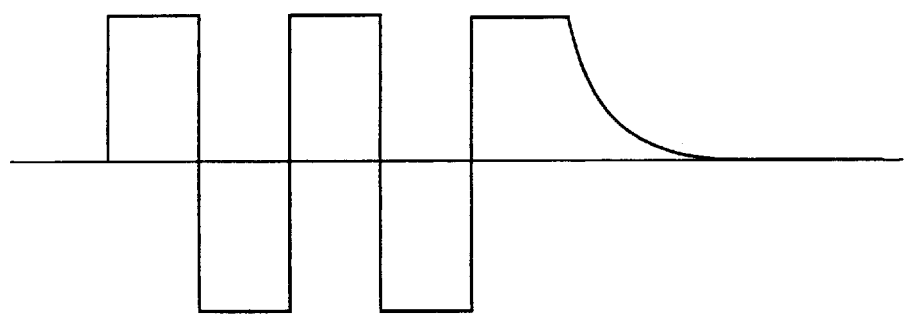

As the result of the dependency, in the display element and the photoconductive switching element, the impedance matching is not obtained for positive pulse application and negative pulse application, and waveform rounding is caused when the voltage is turned off depending on the pulse polarity (final pulse) applied to the device finally. For example, FIG. 10B shows the case where the final pulse is a positive pulse, it is obvious that waveform rounding is caused when the applied voltage is turned off in the case where the pulse applied finally is a positive pulse (a current flows from the light incident side to the display element side). On the other hand, FIG. 10A shows the case where the final pulse is a negative pulse, and in this case the waveform rounding is not caused.

In the case of a display element particularly such as cholesteric liquid crystal, which requires sharp voltage drop when the voltage is turned off to turn on the display, the waveform rounding causes a problem that the display cannot be turned on. To avoid this problem, it is required to reduce the resistance of both polarities to a value extremely smaller than the resistance of the liquid crystal by irradiating a lot of light. Therefore, it is effective to control the final pulse to be a negative pulse as described hereinabove in the case of a display element which requires sharp voltage drop generated when the voltage is turned off.

Figure 11:
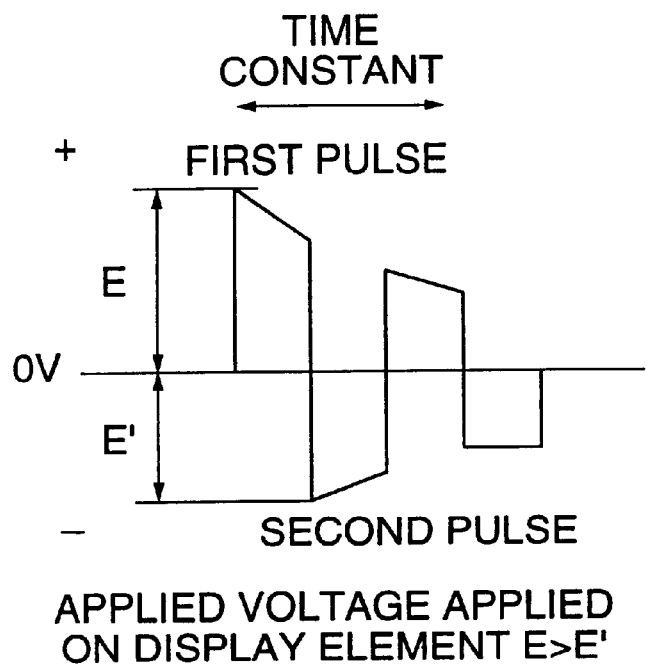
FIG. 11 is a schematic graph for showing the effect of the time constant on the voltage applied on a display element.

Furthermore, the voltage asymmetry characteristic applied to a liquid crystal is caused when the driving pulse is applied depending on the time constant of a liquid crystal display element and a photoconductive switching element. The reason is that the time of an applied pulse is shorter than the time constant of a display element and a photoconductive switching element, in detail, the time constant of a liquid crystal element and a photoconductive switching element ranges from 100 ms to 1 second on the other hand the driving pulse width ranges generally from 1 ms to 100 ms. Accordingly, in the case where the applied pulse is the rectangular wave, voltages obtained when the first polarity is applied and when the next reverse polarity is applied are different from each other, and the difference causes the asymmetric waveform (refer to FIG. 11).

In addition to the difference, in the case where the asymmetric characteristic due to the above-mentioned photoconduction action is overlapped, the polarity of the applied pulse out of negative pulse and positive pulse influences the modulation. In detail, in the case where a circuit having a display element and a photoconductive switching element which are connected in series and this circuit is driven, the modulation to be obtained varies depending on the polarity of the first pulse out of the positive pulse and negative pulse to be applied on the photoconductive switching element side. For example, in the case of a display element which is ON/OFF controlled depending on the product of the voltage and time such as nematic liquid crystal, to bring the display into ON state by applying the first pulse, a higher applied voltage or longer pulse application time is required. Accordingly, in the case where a display element of such type is used, the first pulse having the positive polarity is effective.

Figure 12:
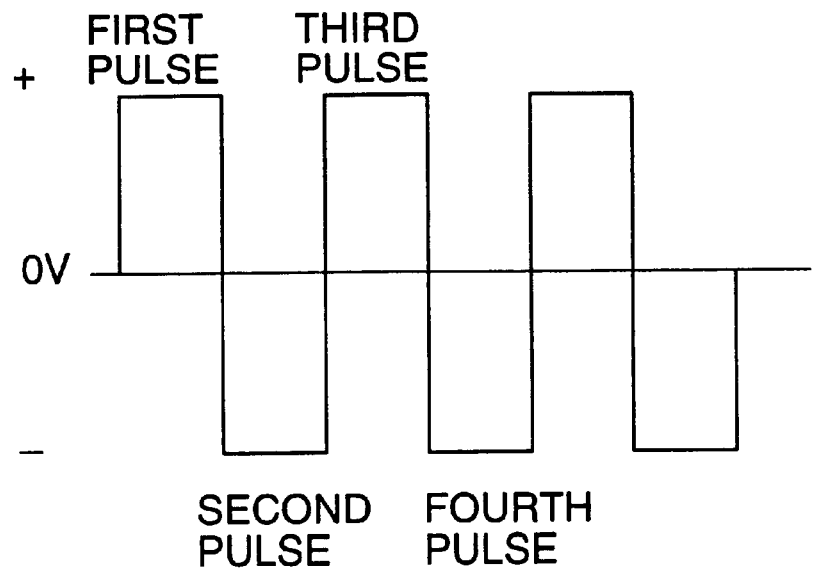
FIG. 12 is a schematic graph for showing one example of a pulse pattern applied on a device of the present invention.

The recording apparatus and the recording method for effectively improving the performance deterioration due to the photoconduction asymmetry characteristic of a photoconductive switching element of the present invention is characterized in that the direction of pulse application on a space modulation element device is controlled. As shown in FIG. 12, the pulse to be applied on the device is the combination of the positive pulse and negative pulse, and the desired number of pulses are applied in the order from the first pulse and then the second pulse, and so forth successively. In the recording apparatus or the recording method of the present invention, one method selected from among three methods is employed which are different from each other in selection of pulse application direction, namely a method in which the first pulse having positive polarity is applied, a method in which the final pulse having negative polarity is applied, and a method in which the first pulse having positive polarity and the final pulse having negative polarity are applied. The method in which the first pulse having positive polarity is applied gives the effect on obtaining of the modulation, the method in which the final pulse having negative polarity is applied gives the sharp voltage OFF characteristic as the result of impedance matching, and the method in which the first pulse having positive polarity and the final pulse having negative polarity are applied gives the both effects.

Accordingly, the above-mentioned recording apparatus of the present invention is provided with a device having a photoconductive switching element and a display element which are combined in the form of a device, a light writing unit for irradiating a light onto the photoconductive switching element, and a pulse input unit for supplying the positive pulse and negative pulse as the driving pulse for driving the device, wherein the pulse input unit applies the final pulse having negative polarity, applies the first pulse having positive polarity, or applies the first pulse having positive polarity and the final pulse having negative polarity.

As the device used in the recording apparatus, the device of the present invention described hereinbefore may be used.

A recording apparatus having a pulse input unit which applies a negative pulse as the final pulse (the polarity of the first pulse may be positive or negative) and having a light writing space modulation device including a cholesteric liquid crystal element as the device is preferably used as the recording apparatus of the present invention.

A device having the above-mentioned functional film for removing the DC component is used preferably as the light writing space modulation device used for the recording apparatus of the present invention. The reason is that, in the case where a photoconductive switching element having plural charge generation layers as a photoconductive switching element having the dual CGL structure, the existence of the above-mentioned functional film brings about effective prevention of asymmetric characteristic of the voltage to be taken out therefrom, namely the voltage to be applied on the display element.

The recording method of the present invention is a recording method in which the above-mentioned recording apparatus is used, and the recording method is characterized in that the positive pulse and the negative pulse are applied on a light transmissible electrode layer and a light transmissible electrode layer disposed on the display element side of the above-mentioned photoconductive switching element as the driving pulse, light writing is performed from the side of the light transmissible electrode layer of the photoconductive switching element, and the pulse is applied by means of any one method selected from among three methods, namely a method in which the first pulse having positive polarity is applied, a method in which the final pulse having negative polarity is applied, and a method in which first pulse having positive polarity and the final pulse having negative polarity are applied.

The voltage to be applied in the recording apparatus or the recording method of the present invention is the AC voltage, wherein the sine waveform, the rectangular waveform, or the triangular waveform may be used. In addition, combination of these waveforms or arbitrary waveform may be used. The subpulse which is insufficient for switching of the display by itself may be added to the driving pulse to improve the display performance.

Some bias component is applied effectively depending on the type of a display element, of course this method may be employed for the device of the present invention.

In the above-mentioned recording apparatus and the recording method of the present invention, the light writing space modulation device having plural charge generation layers is used as an organic photoconductive switching element and the voltage application is controlled as described hereinabove, the device including an organic photoconductive switching element having plural CGLs with interposition of a charge transfer layer and a liquid crystal element can thereby display an image functionally and inexpensively with consistent display performance under light irradiation without higher voltage application, longer pulse application time, and large quantity light irradiation.

Of course, by irradiating a sufficient quantity of light namely the light quantity of about 30 mW/cm$^2$ or more, recording is possible successfully by use of the recording apparatus of the present invention without using the voltage application unit as described hereinabove.

EXAMPLE

The present invention will be described in detail hereinafter with reference to examples, but the present invention is by no means limited by these examples. In the following description, "part" and "%" are based on weight.

First Embodiment

In this example, an organic photoconductive switching element was fabricated and electrodes were formed, and the waveform obtained when an AC voltage was applied on the photoconductive switching element under irradiation of light onto the photoconductive switching element was evaluated.

A benzimidazole perylene (referred to as "BZP" hereinafter) film having a thickness of 0.08 μm was formed as the bottom charge generation layer by means of vacuum deposition on a glass substrate (product of DOW CORNING, 7059) having an ITO film formed thereon. Next, a solution containing 7.2% of 3,3'-dimethyl-N, N'-bis (4-ethylphenyl)-N, N'-bis (4-methylphenyl)-[1,1'-biphenyl]-4,4'-diamine (referred to as "biphenyldiamine base material" hereinafter), 10.8% of bis-phenol (Z) polycarbonate (referred to as "polycarbonate Z" hereinafter), and 82% of monochlorobenzene was diluted to ½ concentration of the original solution with monochlorobenzene, and the diluted solution was coated on the bottom charge generation layer by means of spin coating to form a film having a thickness of 3 μm as the charge transfer layer. On this layer, a BZP film having a thickness of 0.08 μm was formed as the top charge generation layer, and thus a photoconductive switching element was obtained.

On the top charge generation layer of the photoconductive switching element, an Au electrode was formed by spattering. (A photoconductive switching element on which an Au electrode is formed is referred to as "OPC cell" hereinafter depending on the case.)

To observe the waveform, a 2MΩ resistor was connected in series to the fabricated OPC cell, an AC sine wave of 25 Hz and 200 V was applied on the OPC cell under irradiation of light, and the voltage between both ends of the resistor was observed. A halogen light source was used for light irradiation. The light quantity was measured by means of a light power meter, and controlled so as to be 20 mW/cm² at 550 nm.

Comparative Example 1

A photoconductive switching element having the same structure as that of the photoconductive switching element of the first embodiment excepting that there was no top charge generation layer was fabricated, and an Au electrode was formed on the charge transfer layer of this photoconductive switching element to obtain an OPC cell.

Next, a 1MΩ resistor was connected in series to the fabricated cell, the same AC sine wave (25 Hz and 200 $V_{PP}$) as used in the first embodiment was applied on the cell under the same light irradiation condition as used in the first embodiment, the voltage between both ends of the resistor was measured.

Evaluation 1

FIG. 2 is a diagram for showing a voltage waveform obtained when the AC sine wave was applied on the organic photoconductive switching element of the first embodiment of the present invention, and FIG. 3 is a diagram for showing a voltage waveform obtained when the AC sine wave was applied on the organic photoconductive switching element of Comparative Example 1. It is obvious from comparison between FIG. 2 and FIG. 3 that the symmetry with respect to 0 V (GND) line is excellent in the case of the organic photoconductive switching element of the present invention having the bottom charge generation layer, the charge transfer layer, and the top charge generation layer compared with that in the case of the conventional Comparative Example 1.

Second Embodiment

A photoconductive switching element and an OPC cell were fabricated in the same manner as used in the first embodiment excepting that a dispersion containing chloro gallium phthalocyanine and binder was used as the material for the bottom charge generation layer and top charge generation layer and the top and bottom charge generation layers having a thickness of 0.25 μm were formed by use of the dispersion and by means of spin coating as the film forming method.

Comparative Example 2

A photoconductive switching element and an OPC cell were fabricated in the same manner as used in Comparative Example 1 excepting that a dispersion containing chloro gallium phthalocyanine and binder was used and the charge generation layer having a thickness of 0.25 μm was formed by use of the dispersion and by means of spin coating.

Evaluation 2

Figure 13:
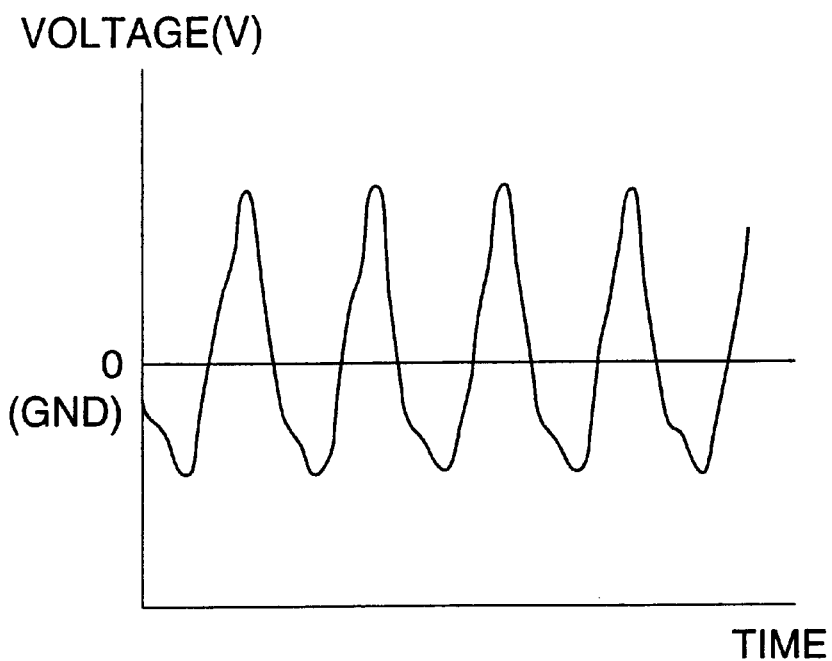
FIG. 13 is a graph for showing a response waveform obtained in the second embodiment.
Figure 14:
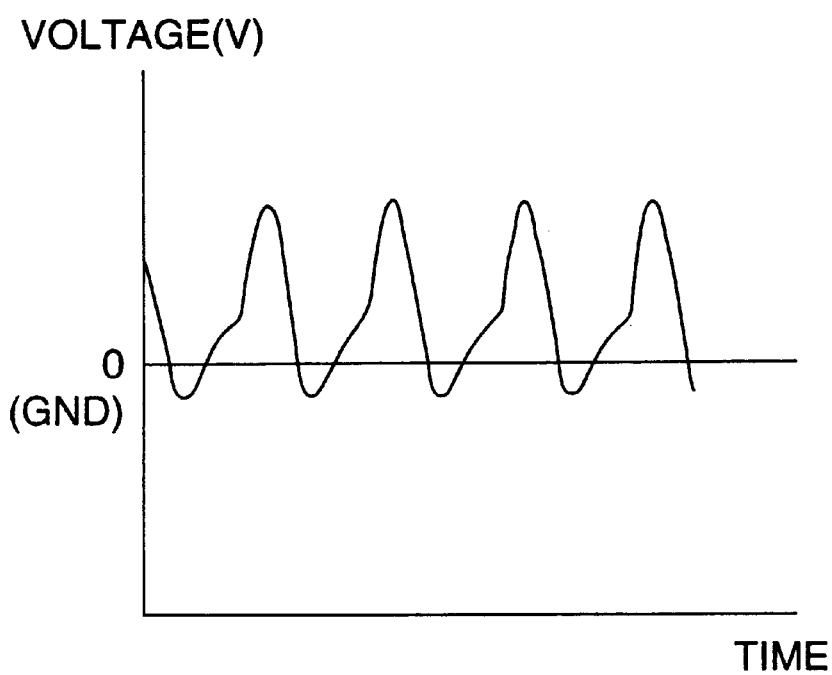
FIG. 14 is a graph for showing a response waveform obtained in Comparative Example 2.

FIG. 13 is a diagram for showing a voltage waveform obtained when the AC sine wave was applied on the organic photoconductive switching element of the second embodiment of the present invention, and FIG. 14 is a diagram for showing a voltage waveform obtained when the AC sine wave was applied on the organic photoconductive switching element of Comparative Example 2. It is obvious from comparison between FIG. 13 and FIG. 14 that the symmetry with respect to 0 V (GND) line is excellent in the cease of the organic photoconductive switching element of the present invention having the bottom charge generation layer, the charge transfer layer, and the top charge generation layer compared that in the case of the conventional Comparative Example 2.

Third Embodiment

A photoconductive switching element and an OPC cell were fabricated in the same manner as used in the first embodiment excepting that a dispersion containing azo base charge generation material and binder was used as the material for the bottom charge generation layer and top charge generation layer and the top and bottom charge generation layers having a thickness of 0.73 μm were formed by use of the dispersion and by means of spin coating as the film forming method.

Comparative Example 3

A photoconductive switching element and an OPC cell were fabricated in the same manner as used in Comparative Example 1 excepting that a dispersion containing an azo base charge generation material and binder was used and the charge generation layer having a thickness of 0.73 μm was formed by use of the dispersion and by means of spin coating.

Evaluation 3

Figure 15:
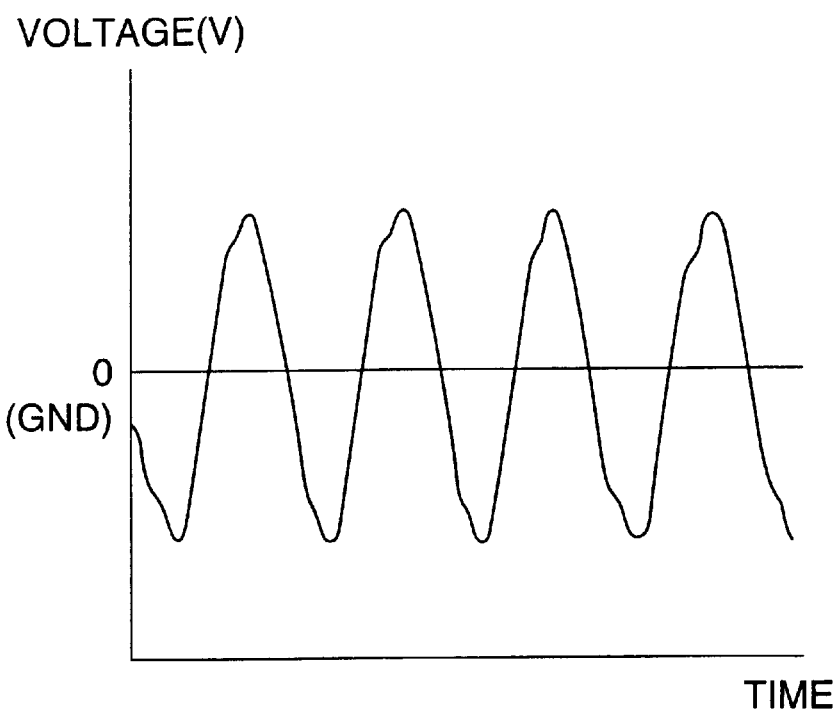
FIG. 15 is a graph for showing a response waveform obtained in the third embodiment.
Figure 16:
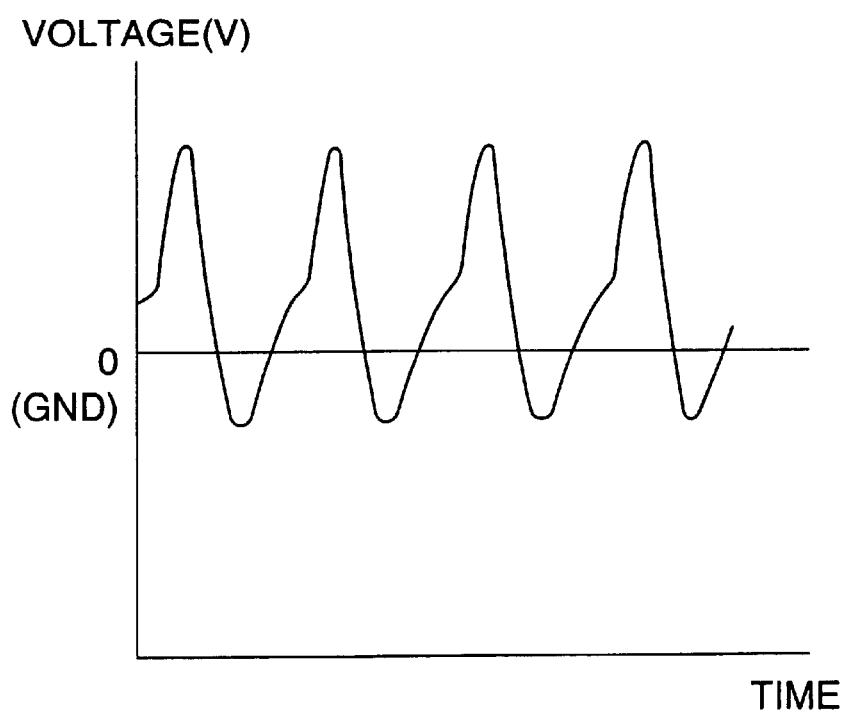
FIG. 16 is a graph for showing a response waveform obtained in Comparative Example 3.

FIG. 15 is a diagram for showing a voltage waveform obtained when the AC sine wave was applied on the organic photoconductive switching element of the third embodiment of the present invention, and FIG. 16 is a diagram for showing a voltage waveform obtained when the AC sine wave was applied on the organic photoconductive switching element of Comparative Example 3. It is obvious from comparison between FIG. 15 and FIG. 16 that the symmetry with respect to 0 V (GND) line is excellent in the case of the organic photoconductive switching element of the present invention having the bottom charge generation layer, the charge transfer layer, and the top charge generation layer compared that in the case of the conventional Comparative Example 3.

Fourth Embodiment

A photoconductive switching element and an OPC cell were fabricated in the same manner as used in the first embodiment excepting that the top and bottom charge generation layers made of titanyl phthalocyanine having a thickness of 0.08 μm were formed by means of vacuum deposition.

Comparative Example 4

A photoconductive switching element and an OPC cell were fabricated in the same manner as used in Comparative Example 1 excepting that a charge generation layer made of titanyl phthalocyanine having a thickness of 0.08 μm was formed by means of vacuum deposition.

Evaluation 4

Figure 17:
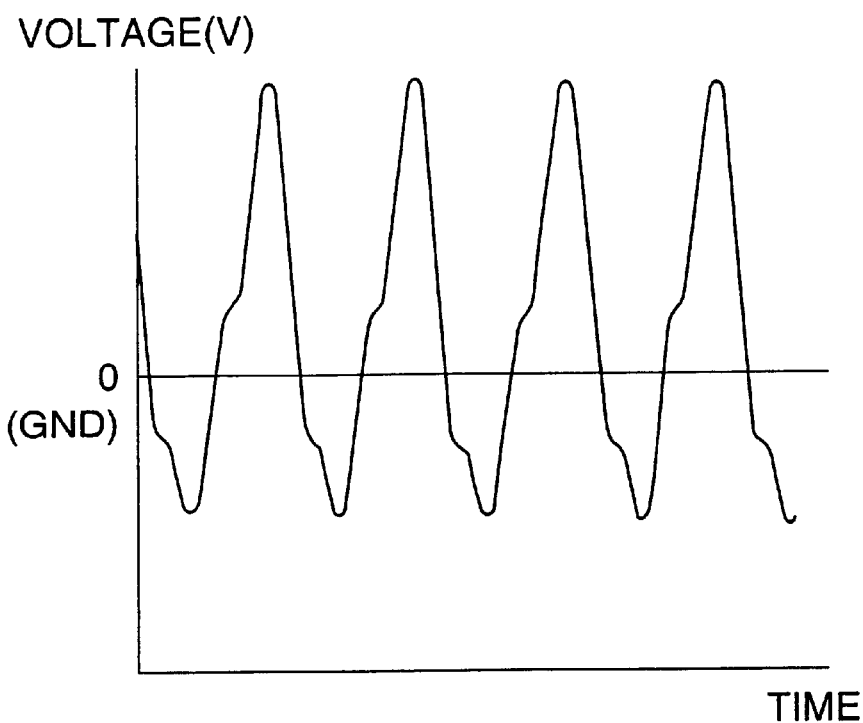
FIG. 17 is a graph for showing a response waveform obtained in the fourth embodiment.
Figure 18:
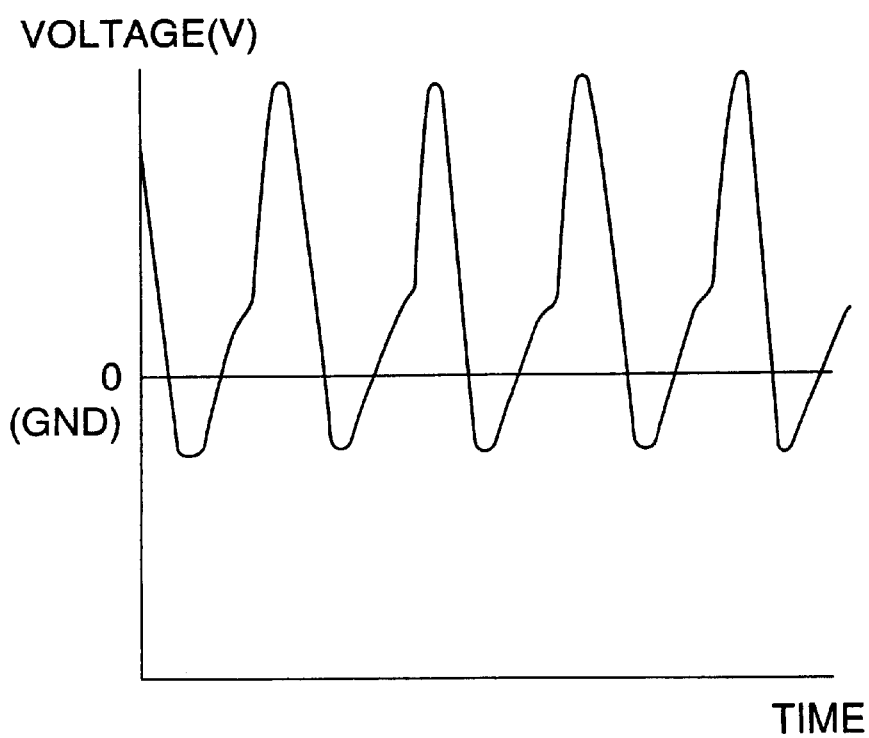
FIG. 18 is a graph for showing a response waveform obtained in Comparative Example 4.

FIG. 17 is a diagram for showing a voltage waveform obtained when the AC sine wave was applied on the organic photoconductive switching element of the fourth embodiment of the present invention, and FIG. 18 is a diagram for showing a voltage waveform obtained when the AC sine wave was applied on the organic photoconductive switching element of Comparative Example 4. It is obvious from comparison between FIG. 17 and FIG. 18 that the symmetry with respect to 0 V (GND) line is excellent in the case of the organic photoconductive switching element of the present invention having the bottom charge generation layer, the charge transfer layer, and the top charge generation layer compared with that in the case of the conventional Comparative Example 4.

Fifth Embodiment

In this example, an OPC cell was fabricated to evaluate the photo-sensitivity as an organic photoconductive switching element.

A BZP film having a thickness of 0.08 μm was formed as the bottom charge generation layer by means of vacuum deposition on a glass substrate (product of DOW CORNING, 7059) having an ITO film formed thereon. Next, a solution containing 7.2% of biphenyldiamine base material, 10.8% of polycarbonate Z, and 82% of monochlorobenzene was diluted to ½ concentration of the original solution with monochlorobenzene, and the diluted solution was coated on the bottom charge generation layer by means of spin coating to form a film having a thickness of 3 μm as the charge transfer layer. On this layer, a BZP film having a thickness of 0.08 μm was formed as the top charge generation layer, and thus a photoconductive switching element was obtained.

On the top charge generation layer of the photoconductive switching element, an Au electrode was formed by spattering to obtain the OPC cell. To observe the waveform, the fabricated cell was connected to an impedance measuring meter, an AC sine wave of 50 Hz was applied under light irradiation and no light irradiation, and the contrast between the light irradiation and no light irradiation with changing the voltage was measured to evaluate the photo-switching performance. A halogen light was used for light irradiation. The light quantity was measured by means of a light power meter, and controlled so as to be 20 mW/cm² at 550 nm.

Evaluation 5

Figure 19:
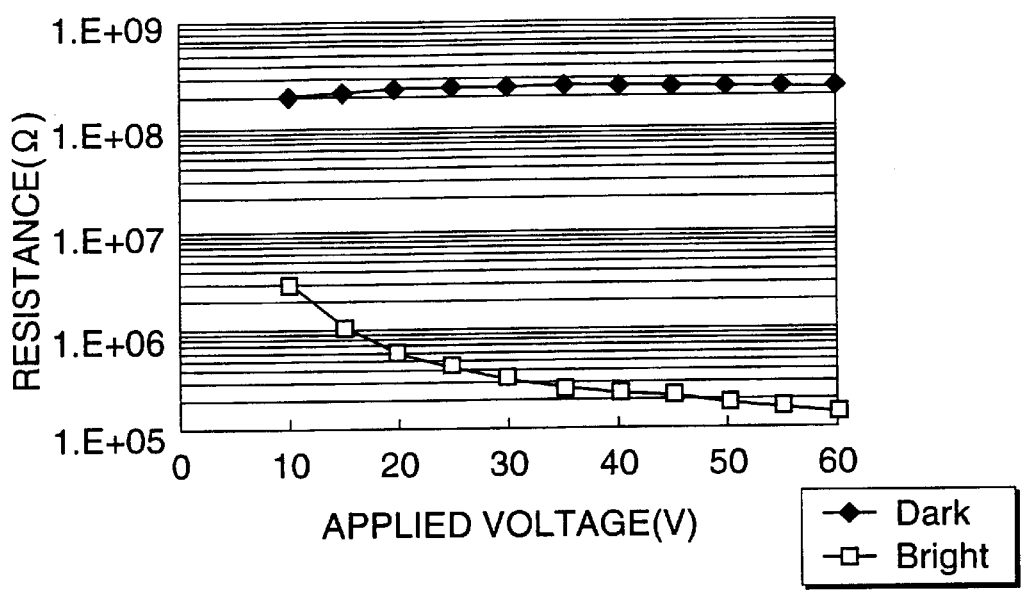
FIG. 19 is a graph for showing the resistance observed when an AC sine wave is applied under light irradiation or no light irradiation to a cell of the photoconductive switching element used in the fifth embodiment.

FIG. 19 is a graph for showing the characteristic of the photoconductive switching element of the present invention. The ratio of the resistance under light irradiation to the resistance under no light irradiation was measured with changing the voltage. At a voltage of 10 V the ratio is 100:1, and at a voltage of 40 V the ratio is 1000:1. The resistance difference between under light irradiation and under no light irradiation is large at a voltage as relatively low as 10 $V_{pp}$, this result suggests that the photoconductive switching element of the present invention can be used practically.

Sixth Embodiment

In this example, an evaluation apparatus was fabricated to evaluate the display characteristic of a combination of an organic photoconductive switching element and an image display element (liquid crystal cell) connected to the photoconductive switching element.

The liquid crystal cell is voltage-driven by use of the OPC cell fabricated in the first embodiment. A cell of a cholesteric liquid crystal was connected to the OPC cell of the first embodiment, and the operation under light irradiation and under no light irradiation was checked. For the purpose of measurement, the cell of the cholesteric liquid crystal was planer layer and made blue color over the entire surface, the voltage of various rectangular waveform was applied as the pulse group to measure the reflectance change.

HAYABEADS L-25 (product of Hayakawa Rubber) which was spherical spacer having a diameter of 5 μm with adhesive was wet-dispersed on a glass substrate (product of DOWCORNING, 7059) with ITO, and another glass substrate with ITO was brought into close contact so that the ITO film was in contact with the spacer. The above-mentioned process was operated at a room temperature, and then the glass substrates and spacer were heated at 110° C. for 30 minutes to adhere the spacer to both glass substrates with ITO, and a cell was obtained. Cholesteric liquid crystal, which selectively reflects blue light, was used as the liquid crystal. The liquid crystal mixture obtained by mixing 64.9% of nematic liquid crystal ZLI4389 (product of Merck) having positive dielectric constant anisotropy, 17.5% of dextrorotatory chiral agent CB15 (product of Merck), and 17.5% of dextrorotatory chiral agent CE2 (product of Merck) was used for liquid crystal cell.

The liquid crystal mixture was injected into the above-mentioned cell and sealed to obtain a liquid crystal cell.

Figure 20:
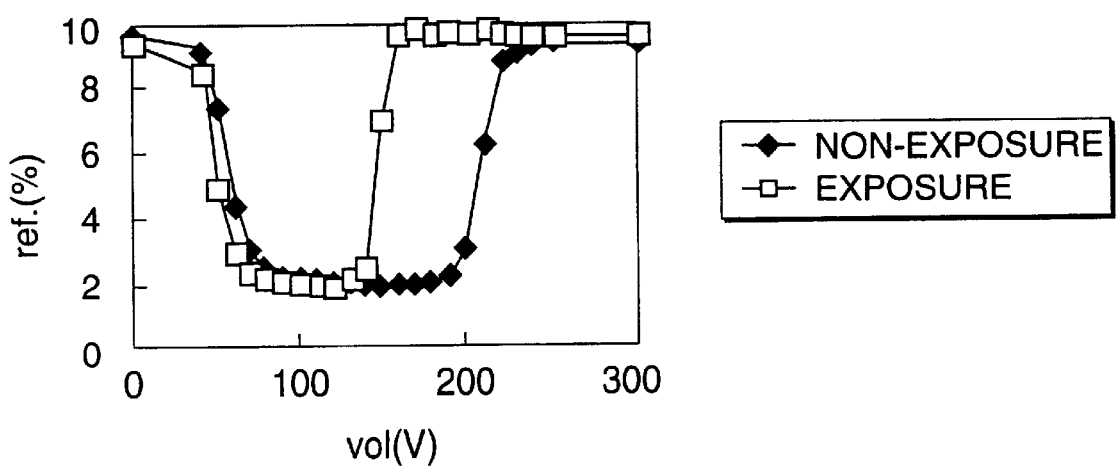
FIG. 20 is a graph for showing the reflectance obtained in the sixth embodiment.

The Au electrode of the OPC cell used in the first embodiment was connected in series to the ITO electrode of the above-mentioned liquid crystal cell, the voltage was applied between the ITO electrode of the OPC cell and the ITO electrode of the liquid crystal cell under light irradiation to measure the reflectance of the cholesteric liquid crystal. A halogen light source was used for light irradiation. The light quantity was measured by means of a light power meter, and controlled so as to be 20 mW/cm² at 550 nm. The 50 Hz voltage was changed in a range from 0 to 300 $V_{pp}$ As the driving pulse, 50 Hz rectangular wave was used, the first pulse was a positive pulse, the second pulse was a negative pulse, and the pulse was applied up to the eighth pulse successively, and the final eighth pulse was a negative pulse. Positive pulses were applied on the transparent electrode of the light irradiation side substrate. The reflectance under no light irradiation was measured. The result is shown in FIG. 20.

Comparative Example 5

In this example, the cholesteric liquid crystal cell having the same structure as fabricated in the sixth embodiment was connected to the OPC cell having the same structure as fabricated in the above-mentioned Comparative Example 1 in the same manner, and the reflectance change was measured under the same light irradiation and voltage application condition as employed in the sixth embodiment.

Evaluation 6

The result of reflectance in the case where the organic photoconductive switching element of the present invention was used is shown in FIG. 20. It is obvious from FIG. 20 that high reflectance (10%) was obtained under exposure and low reflectance (2%) was obtained under non-exposure in the range from 150 V to 200 V. This experiment was repeated 1,000 times, and consistent result was reproduced. From this result, it is shown that light switching is sufficiently operated by means of the photoconductive switching element of the present invention.

On the other hand, in Comparative Example 5, blue and black were not colored under the same light irradiation.

Seventh Embodiment

The same photoconductive switching element as used in the first embodiment was used excepting that polyethyleneterephthalate (PET), that is flexible substrate, was used as the substrate instead of glass substrate, and the photoconductive switching element was connected to a liquid crystal cell in the same manner as used in the sixth embodiment to measure the reflectance. The light irradiation was 10 mW/cm$^2$ at 550 nm.

Evaluation 7

Figure 21:
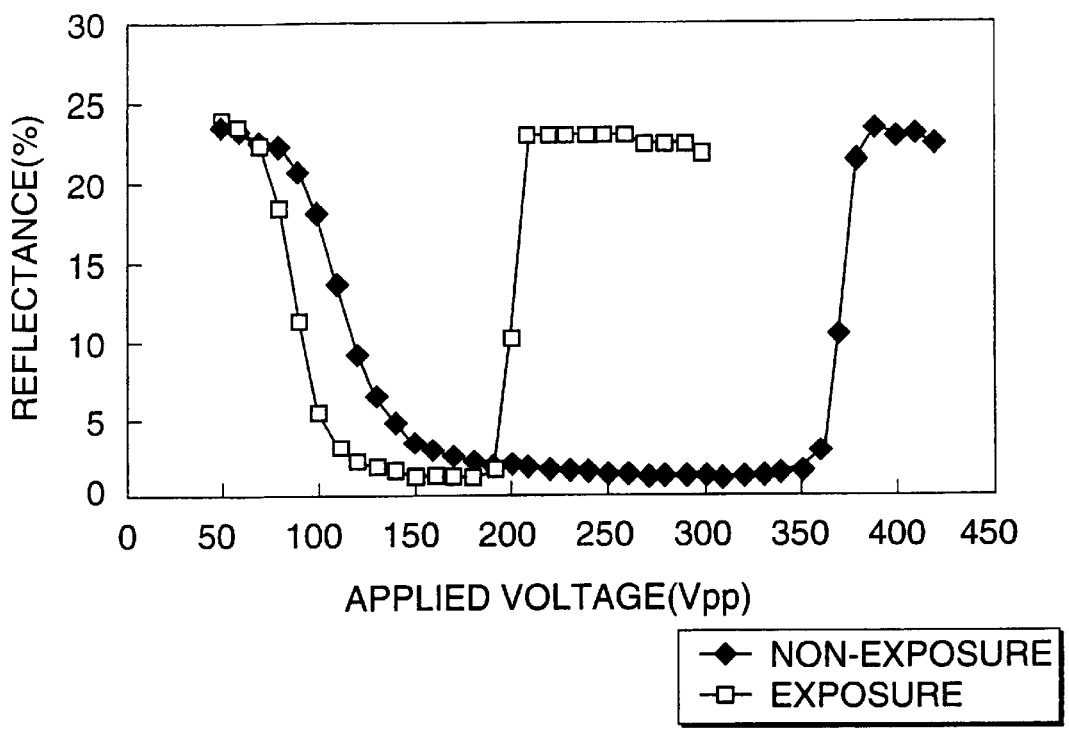
FIG. 21 is a graph for showing the reflectance obtained in the seventh embodiment.

As obvious from FIG. 21, a high reflectance (22%) is obtained under exposure and a low reflectance (2%) is obtained under non-exposure in a voltage range from 200 to 300 $V_{pp}$. This experiment was repeated 1,000 times, and consistent result was reproduced. From this result, it is shown that the photoconductive switching element having a plastic substrate as the substrate is sufficiently usable for light switching like the photoconductive switching element having a glass substrate.

Eighth Embodiment

In this example, a device in which an organic photoconductive switching element, a bistable liquid crystal display element, and a functional film for removing the DC component were incorporated was fabricated, and the reflectance change with application of an AC voltage was evaluated. Another device was fabricated in the same manner as used for fabrication of the above-mentioned device excepting that the functional film for removing the DC component was not incorporated to clarify the result obtained by means of the functional film for removing the DC component.

A BZP film having a thickness of 0.08 $\mu$m was formed as the bottom charge generation layer by means of vacuum deposition on a glass substrate (product of DOW CORNING, 7059) having an ITO film formed thereon. Next, a solution containing 7.2% of biphenyldiamine base material, 10.8% of polycarbonate Z, and 82% of monochlorobenzene was diluted to ½ concentration of the original solution with monochlorobenzene, and the diluted solution was coated on the bottom charge generation layer by means of spin coating to form a film having a thickness of 3 $\mu$m as the charge transfer layer. On this layer, a BZP film having a thickness of 0.08 $\mu$m was formed as the top charge generation layer, and thus a photoconductive switching element was obtained.

A polyvinylalcohol solution was coated by means of spin coating and dried to form a functional film for removing the DC component having a thickness of 1 $\mu$m. The capacitance of this polyvinylalcohol film was not measured directly, but a capacitance of about 3 nF/cm$^2$ was obtained by means of a separate measurement.

On this film, a liquid crystal cell was connected in series. In detail, HAYABEADS L-25 (product of Hayakawa Rubber) which was spherical spacer having a diameter of 5 $\mu$m with adhesive was wet-dispersed on the functional film for removing the DC component, and a glass substrate with ITO was brought into close contact so that the ITO film was in contact with the spacer. The above-mentioned process was operated at a room temperature, and then the glass substrates and spacer were heated at 110° C. for 30 minutes to adhere the spacer to both glass substrates with ITO, and thus a liquid crystal cell having the photoconductive switching element was obtained.

A mixture of 72.3% of nematic liquid crystal E186 (product of Merck) having positive dielectric constant anisotropy, 13.9% of dextrorotatory chiral agent CB15 (product of Merck), and 13.9% of dextrorotatory chiral agent CE2 (product of Merck) was used as a cholesteric liquid crystal which selectively reflects green light.

The liquid crystal mixture was injected into the above-mentioned cell and sealed to obtain a desired light writing space modulation element.

On the other hand, to evaluate the action of the functional film for removing the DC component, a light writing space modulation element was fabricated in the same manner as used for fabrication of the above-mentioned light writing space modulation element excepting that the functional film for removing the DC component was not formed.

Evaluation 8

Figure 22:
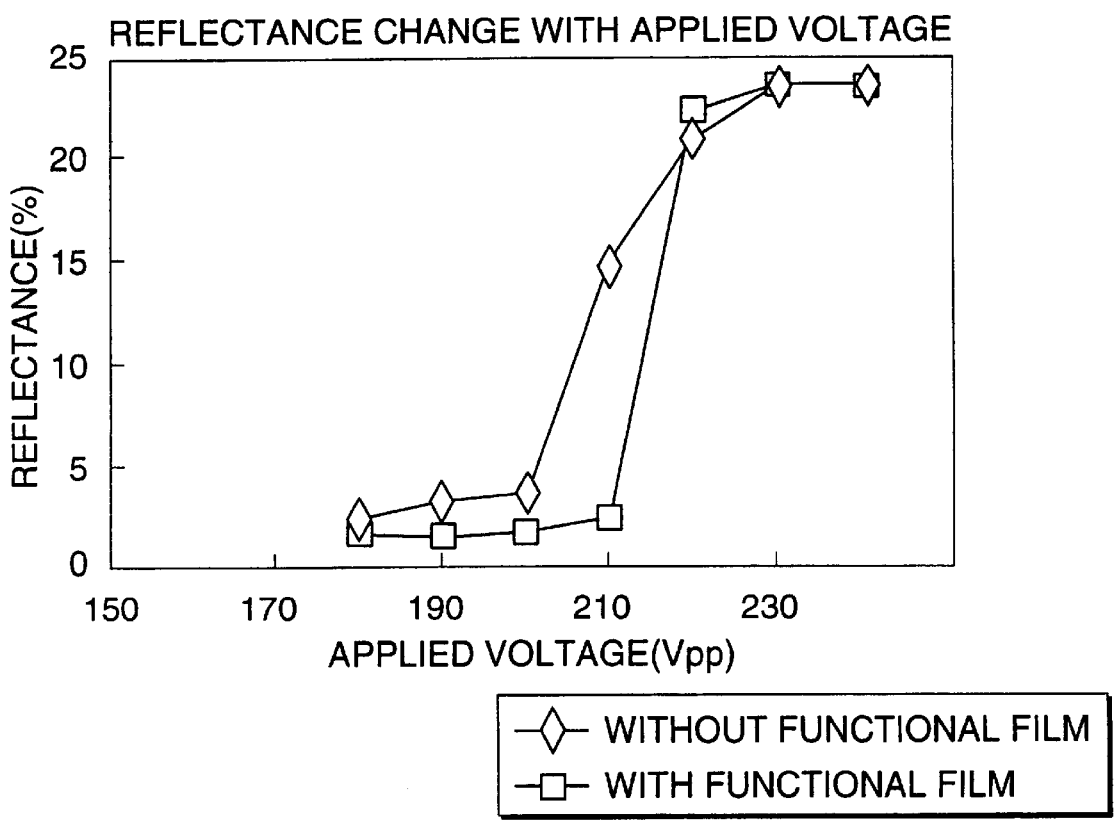
FIG. 22 is a graph for showing the reflectance obtained in the eighth embodiment.

A monochromatic liquid crystal panel for incident light was placed closely on the glass substrate of the photoconductive switching element of the light writing space modulation element (with and without functional film for removing the DC component) of the eighth embodiment obtained as described hereinabove. A halogen lamp light source was used as a light source. The incident light quantity irradiated from the liquid crystal panel was controlled so as to be 130 mW/cm$^2$ at 550 nm. A voltage was applied between electrodes of the above-mentioned light writing space modulation element and the reflectance was measured. As the driving pulse, 50 Hz rectangular wave was used, the first pulse was a positive pulse, the second pulse was a negative pulse, and the pulse was applied up to the eighth pulse successively, and the final eighth pulse was a negative pulse. Positive pulses were applied on the transparent electrode of the light irradiation side substrate. The reflectance change with voltage application was measured by means of Xrite. The result is shown in FIG. 22.

In comparison between the both graphs, in the case of the device formed without functional film for removing the DC component, the reflectance increases at a low applied voltage and increases relatively sharply with the voltage change. On the other hand, in the case of the device formed with the above-mentioned functional film, the reflectance increases with the voltage change more sharply than that of the device having no functional film. This result shows that the device with a functional film for removing the DC component is an excellent liquid crystal display. Though a high threshold voltage is suspected because a partial pressure on the functional film is generated by forming the above-mentioned functional film, the high threshold voltage was not observed and there was no performance deterioration due to the above-mentioned functional film.

Ninth Embodiment

In this example, it was confirmed that a device in which an organic photoconductive switching element, a bistable liquid crystal element, and a functional film for removing the DC component were incorporated described in the eighth embodiment was capable of image displaying.

The device described in the eighth embodiment, a transmission type TFT liquid crystal display served as a light writing unit, a halogen lamp served as a light source were used. A monochromatic liquid crystal panel and a halogen lamp light source were used. In this example, the above-mentioned liquid crystal display was used and a light was incident onto the photoconductive switching element in the form of an image. The light quantity irradiated from the image of the liquid crystal display was controlled so as to be 130 mW/cm² at 550 nm as in the case of the eighth embodiment.

Evaluation 9

A voltage was applied on the combined device of the eighth embodiment, and a monochromatic color image was displayed. Eight pulses of the rectangular wave of 50 Hz and 175 Vpp were applied as the writing pulse. As the driving pulse, the first pulse was a positive pulse, the second pulse was a negative pulse, and the pulse was applied up to the eighth pulse successively, and the final eighth pulse was a negative pulse. Positive pulses were applied on the transparent electrode of the light irradiation side substrate. As the result, a green image was obtained on the light irradiation portion and a monochromatic image was obtained on the dark portion. The experiment was repeated 1,000 times and the consistent result was obtained.

Tenth Embodiment

Figure 23:
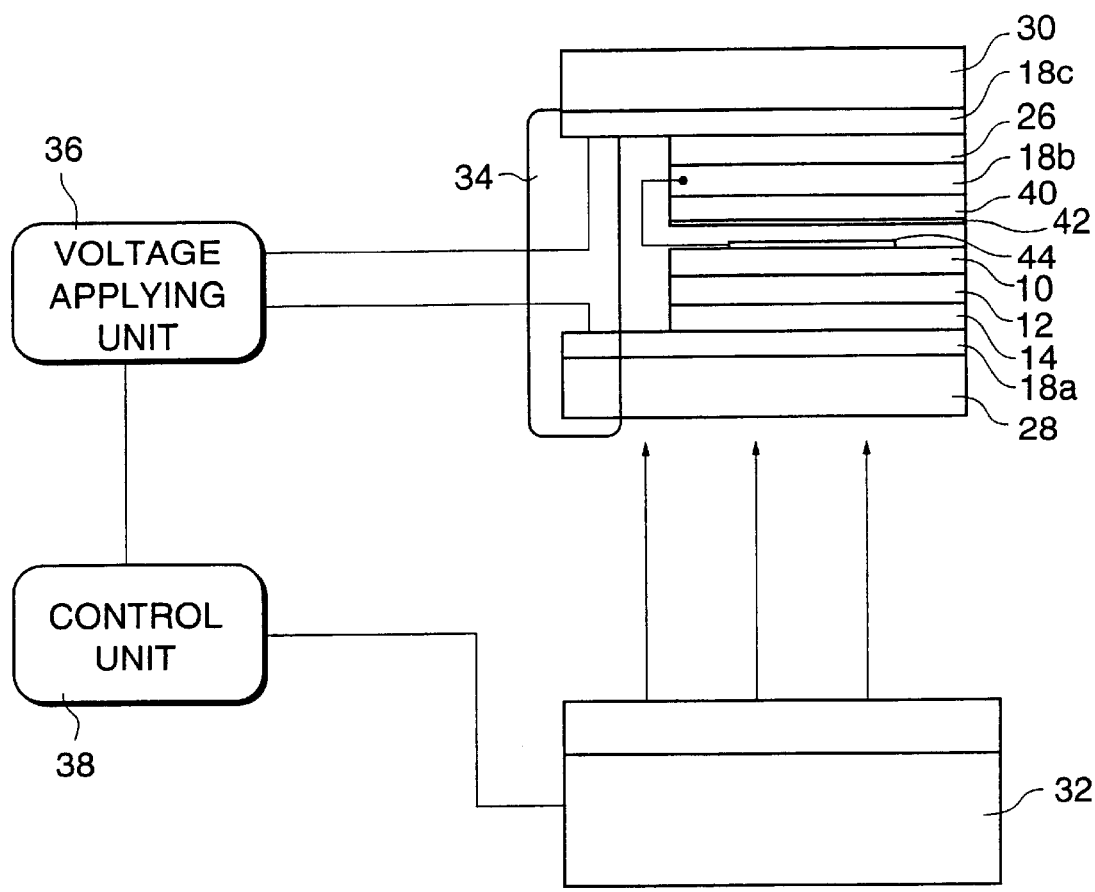
FIG. 23 is a schematic diagram for illustrating a recording apparatus of the tenth embodiment.

In this example, the effect of the recording apparatus and the recording method for applying a specific voltage was confirmed. The structure of the recording apparatus of this example is shown in FIG. 23. In FIG. 23, 28 denotes a light incident side transparent substrate, 18a denotes a transparent electrode, 14 denotes a bottom charge generation layer, 12 denotes a charge transfer layer, 10 denotes a top charge generation layer, and 44 denotes an Au electrode (the structure having the above-mentioned components from 28 to 44 is referred to as OPC cell hereinafter). 30 denotes a display side substrate, 18c denotes a transparent electrode, 26 denotes a liquid crystal display element, 18b denotes a transparent electrode, 40 denotes a substrate, and 42 denotes a shading film (the structure having the above-mentioned components from 30 to 42 is referred to as liquid sealing cell hereinafter), and 32 denotes a light writing unit, 34 denotes a connector, 36 denotes a voltage application unit, and 38 denotes a control unit.

The connector 34 for connecting to the top and bottom electrodes of the light writing space modulation device is a connector for connecting to the transparent electrode 18a disposed adjacent to the light incident side transparent substrate and to the transparent electrode 18c disposed adjacent to the display side substrate, and has contact points on both sides. Of course, the connector is detachable.

The voltage application unit 36 has an EPROM in which the waveform has been stored and a DA conversion device as the pulse generation unit, DA-converts the waveform read out from the ROM when a voltage is applied, and applies the converted waveform to the space modulation device. The waveform of the driving pulse to be applied on the space modulation device is the rectangular pulse in the form of combination the positive pulse and the negative pulse.

A transmission type TFT liquid crystal display and a halogen lamp light source were used as the light writing unit 32.

A personal computer was used as the control unit 38 for controlling the voltage application unit 36 and the light writing unit 32.

An OPC cell was fabricated as described hereunder. In detail, a BZP film having a thickness of 0.02 μm was formed as the bottom charge generation layer (14) by means of vacuum deposition on a glass substrate (28) (product of DOW CORNING, 7059) having an ITO film (18a) formed thereon. Next, a solution containing 7.2% of a biphenyl-diamine base material, 10.8% of polycarbonate Z, and 82% of monochlorobenzene was diluted to ½ concentration of the original solution with monochlorobenzene, and the diluted solution was coated on the bottom charge generation layer (14) by means of spin coating to form a film having a thickness of 3 μm as the charge transfer layer. On this layer, a BZP film having a thickness of 0.15 μm was formed as the top charge generation layer 10), and thus a photoconductive switching element was obtained. An Au electrode (44) having a thickness of 50 Å was formed on the top charge generation layer of the photoconductive switching element to obtain an OPC cell.

A cell in which liquid crystal was to be sealed was fabricated as described hereunder. In detail, a shading layer (42) consisting of TFT black matrix resin (product of Tokyo Ohka, brand name is BKR) was formed on one side of a glass substrate (40) (product of DOW CORNING, 7059), and a transparent electrode (18b) layer having a thickness of 200 Å made of an ITO film was formed on the opposite side. On the ITO film, HAYABEADS L-25 (product of Hayakawa Rubber) which was spherical spacer having a diameter of 5 μm with adhesive was wet-dispersed, and a glass substrate (30) with ITO (18c) was brought into close contact so that the ITO film was in contact with the spacer. The above-mentioned process was operated at a room temperature, and then the glass substrates and spacer were heated at 110° C. for 30 minutes to adhere the spacer to both glass substrates with ITO, and a cell was obtained.

A mixture of 72.3% of nematic liquid crystal E186 (product of Merck) having positive dielectric constant anisotropy, 13.9% of dextrorotatory chiral agent CB15 (product of Merck), and 13.9% of dextrorotatory chiral agent CE2 (product of Merck) was used as a cholesteric liquid crystal which selectively reflects green light to be sealed in the cell. The liquid crystal mixture was injected into the above-mentioned cell and sealed to obtain a liquid crystal cell.

Next, the Au electrode 44 of the above-mentioned OPC cell was connected to the transparent electrode 18b of the liquid crystal cell to obtain a desired light writing space modulation element.

Furthermore, as shown in FIG. 23, the transparent electrodes 18a and 18c of the light writing space modulation element were connected to the voltage application unit by way of the connector 34, and the control unit 38 and the light writing unit 32 were arranged and connected as shown in FIG. 23 to obtain a recording apparatus of the present invention.

To confirm the effect of the recording method of the present invention, as the driving pulse, the first pulse was a positive pulse, the second pulse was a negative pulse, and the pulse was applied up to the eighth pulse successively, and the final eighth pulse was a negative pulse. A pulse light having a pulse width of 20 ms, a wavelength of 550 nm, and a power of 6 mW/cm² was irradiated, and the reflectance change with the applied voltage was evaluated. To evaluate the reflectance change, the irradiation pattern was set so that all the display elements were turned on.

Comparative Example 6

In this comparative example, the reflectance was measured in the same manner as used in the tenth embodiment excepting that, as the driving pulse, the first pulse was a negative pulse, the second pulse was a positive pulse, and the pulse was applied successively up to the eighth pulse, the final eighth pulse was a positive pulse.

Evaluation 10

Figure 24:
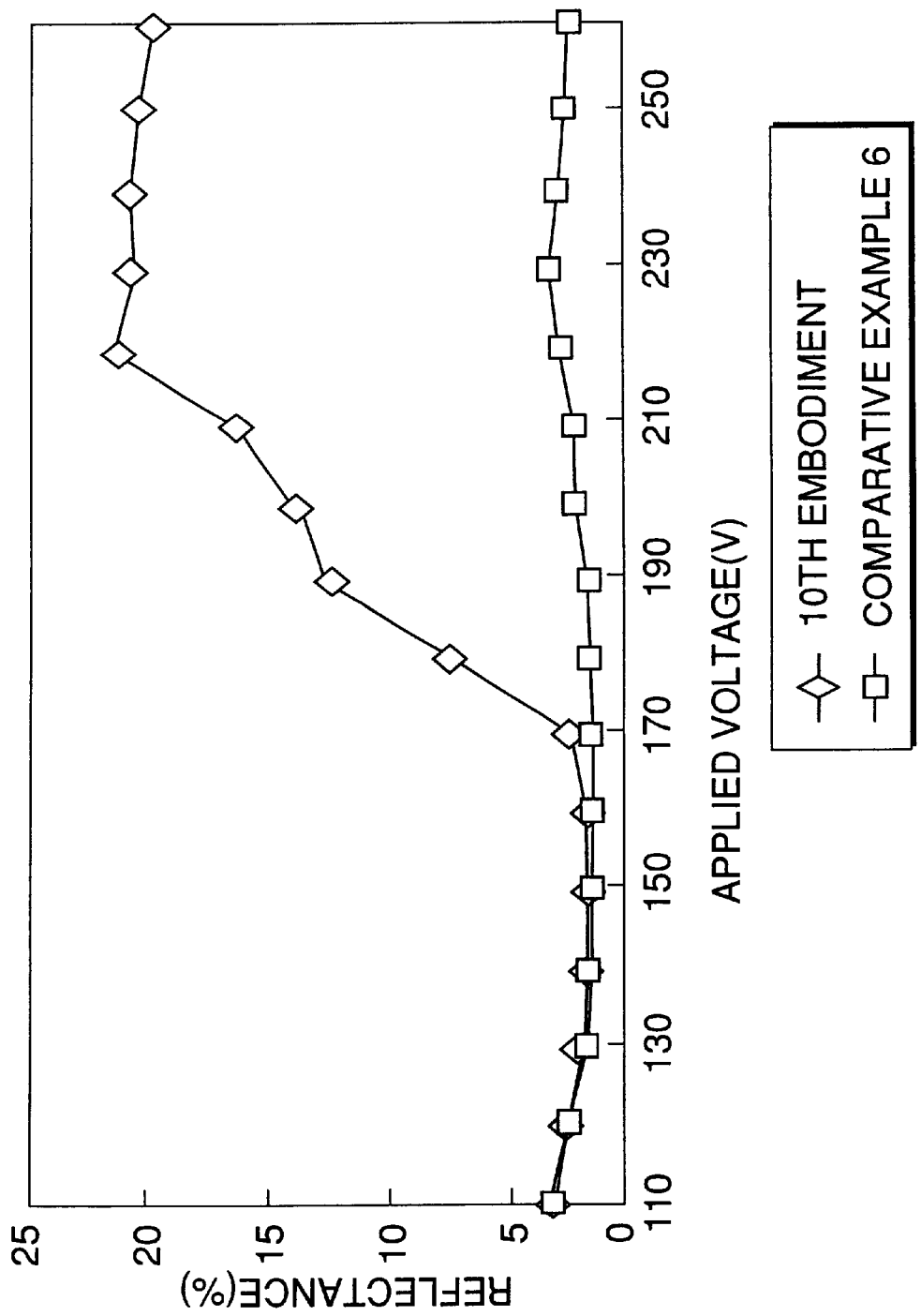
FIG. 24 is a graph for showing the reflectance obtained in the tenth embodiment and Comparative Example 6.

The comparison result between the tenth embodiment and Comparative Example 6 is shown in FIG. 24. It is shown that the display element is turned on when a voltage of 220 Vpp or higher is applied in the case where a negative pulse is applied to the light incident substrate side as the final driving pulse even if the power of the incident light is as low as 6 mW/cm$^2$ as in the tenth embodiment. On the other hand, it is difficult to turn on the display element when the voltage is applied because the light power is too low in Comparative Example 6 in which a positive pulse is applied as the final driving pulse.

Eleventh Embodiment

The reflectance was measured on the device having a functional film for removing the DC component fabricated in the eighth embodiment in the same manner as used in the eighth embodiment excepting that light irradiation of 13 mW/cm$^2$ at 550 nm emitted from the liquid panel was incident onto the photoconductive switching element, and pulse application in which the first pulse was a positive pulse of 20 ms and pulse application continued up to tenth pulse (the final pulse is a negative pulse), and this consecutive pulse application was repeated three times with a 100 ms pause between consecutions.

Comparative Example 7

The reflectance was measured in the same manner as used in the eleventh embodiment excepting that the eleventh pulse of positive polarity was applied as the final pulse.

Evaluation 11

Figure 25:
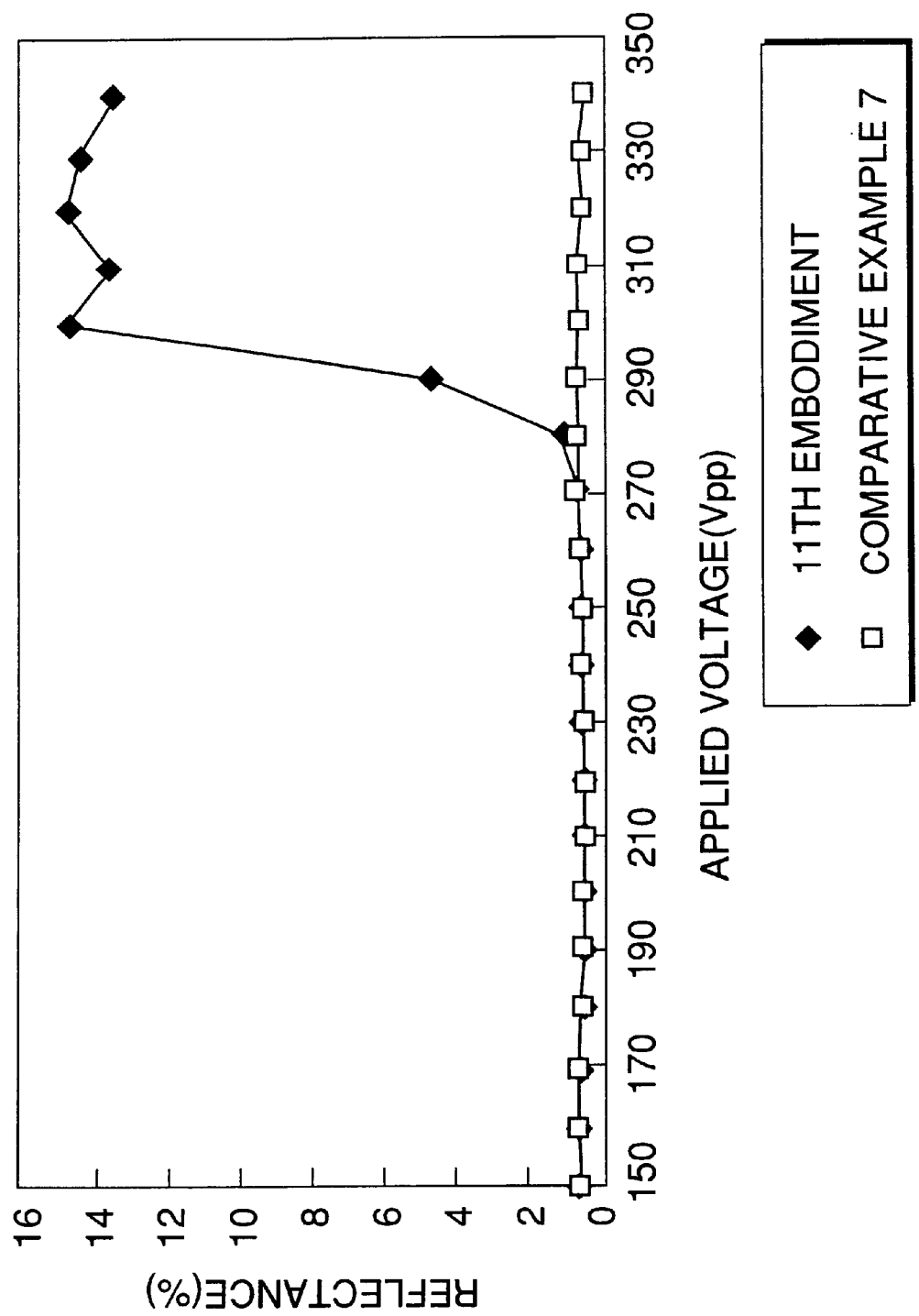
FIG. 25 is a graph for showing the reflectance obtained in the eleventh embodiment and Comparative Example 7.

As shown in FIG. 25, the high reflectance is obtained in the range from 300 V$_{pp}$ and higher when the voltage is applied to the device of the present invention so that the final pulse is a negative pulse, and the reflectance increases sharply with the voltage change. On the other hand, in the case where the final pulse is a positive pulse, the reflectance does not increase in spite of application of a voltage of 350 V and the light switching action is not observed.

Twelfth Embodiment

A light writing space modulation device and a recording apparatus were fabricated in the same manner as used in the tenth embodiment excepting that the top and bottom charge generation layers having the dual CGL structure of the photoconductive switching element used in the tenth embodiment was replaced with titanium phthalocyanine films having a thickness of 0.08 μm and the pulse voltage was applied and the reflectance was measured in the same manner as used in the tenth embodiment.

Comparative Example 8

The reflectance change was evaluated in the same manner as used in the twelfth embodiment excepting that the first pulse of negative polarity was applied on the display substrate side transparent electrode and the final pulse of positive polarity was applied.

Evaluation 12

The voltage was applied to the light writing space modulation elements of the twelfth embodiment and Comparative Example 8 obtained as described hereinabove to measure the reflectance. A light with a power of 6 mW at wavelength of 550 nm and a pulse width of 20 ms was irradiated and the reflectance change concomitant with applied voltage change was evaluated. To evaluate the reflectance change, the irradiation pattern was set so that all the display element were turned on.

Figure 26:
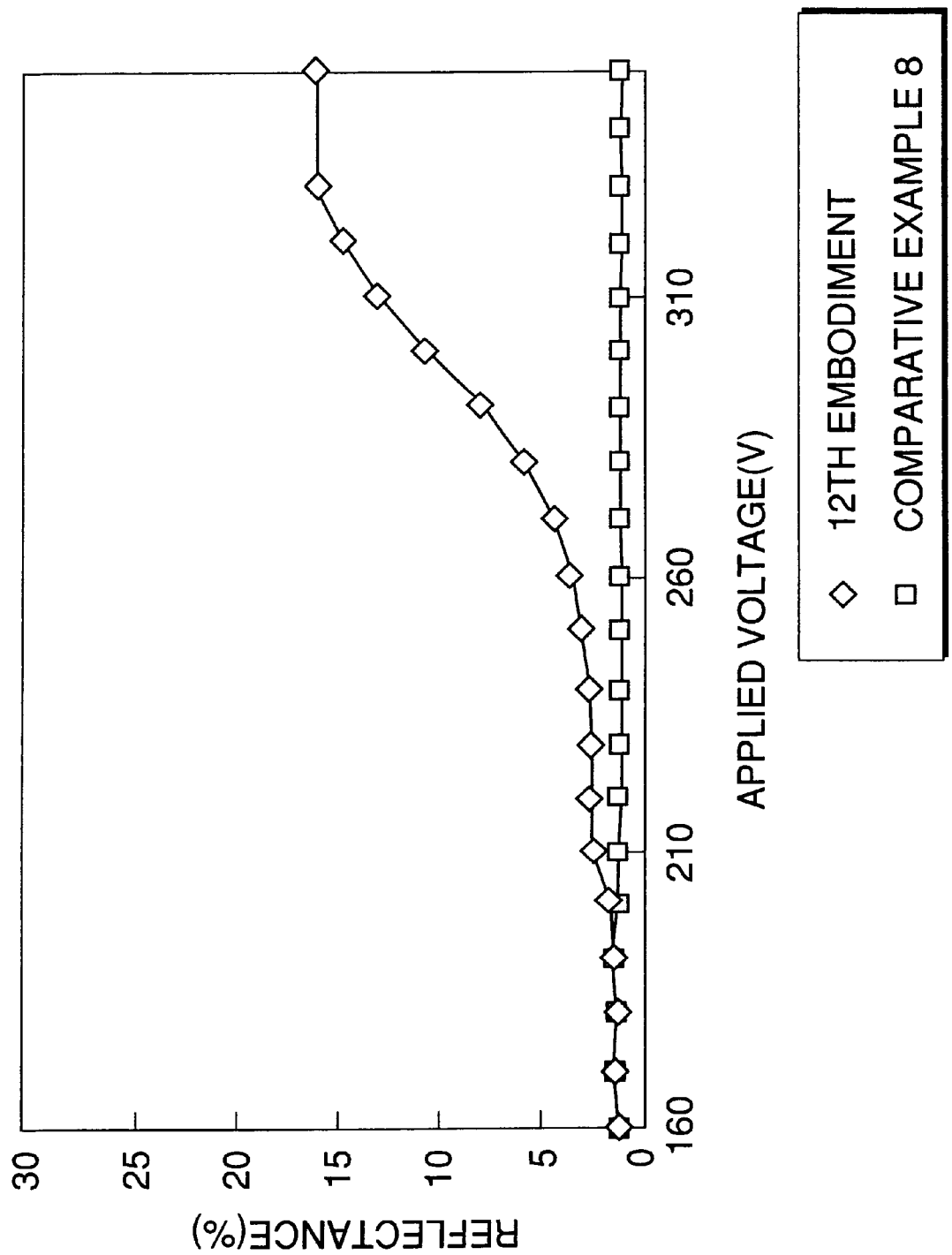
FIG. 26 is a graph for showing the reflectance obtained in the twelfth embodiment and Comparative Example 8.
Figure 27:
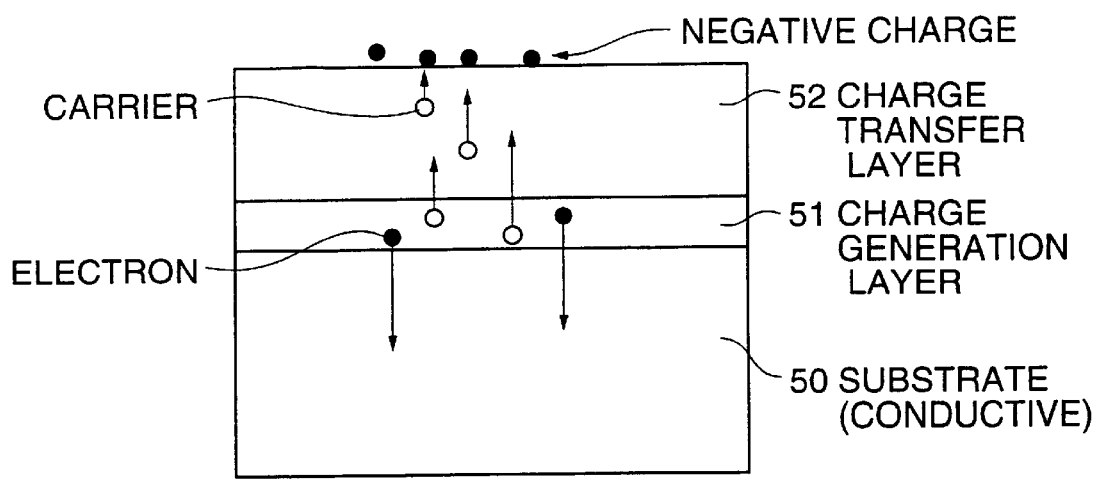
FIG. 27 is a diagram for illustrating the laminated structure of an electrophotographic photosensitive composite in which a conventional organic photoconductor is used.
Figure 28:
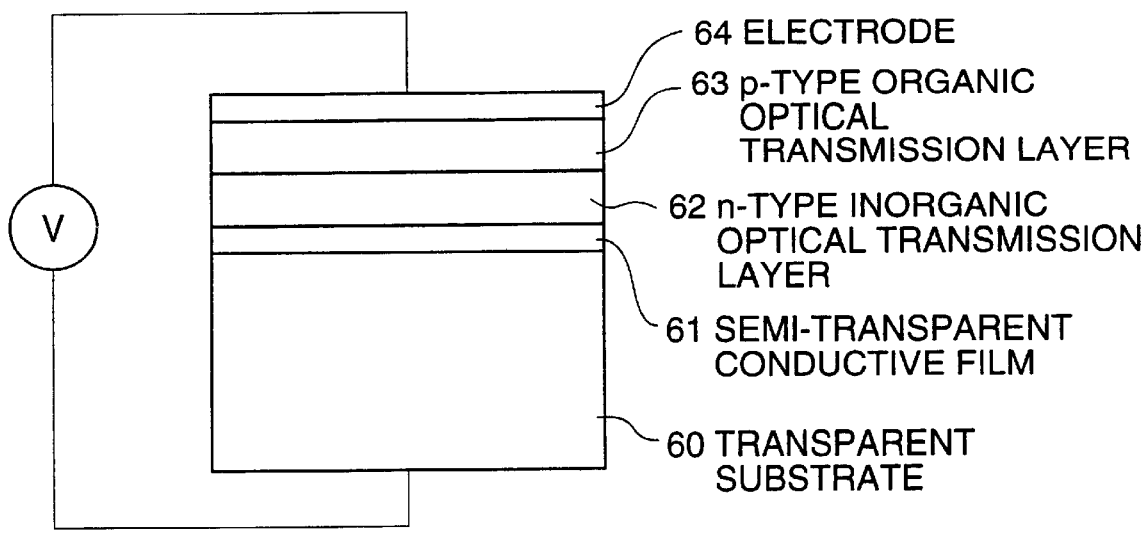
FIG. 28 is a diagram for illustrating the laminated structure of an optical semiconductor for a solar cell in which a conventional organic photoconductor is used.

The result is shown in FIG. 26.

In comparison between both graphs, it is shown that the display element is turned on when a voltage of 320 Vpp or higher is applied in the case where a negative pulse is applied to the light incident substrate side as the final driving pulse. On the other hand, it is difficult to turn on the display element in the case of Comparative Example 8 in which a positive pulse is applied as the final driving pulse.

The photoconductive switching element of the present invention having at least a charge generation layer, a charge transfer layer, and a charge generation layer laminated in this order on a substrate does not require an expensive material and is fabricated by use of an ordinary organic photoconductive compound (OPC), and is mass-produced at a low cost and exhibits the light switching function effectively. In detail, because the operation of the photoconductive switching element of the present invention involves the voltage waveform obtained when a light is irradiated which is symmetrical with respect to the 0 V line, that is, the positive side shape and the negative side shape are similar to each other, even though the polarity is inverted, the photoconductive switching element is suitable for driving a functional element such as a liquid crystal display device which is AC driven basically and sensitive to the DC voltage component. Furthermore, the photoconductive switching element of the present invention involves the large resistor value difference and large reflectance difference between light irradiation and no light irradiation, and the photoconductive switching element of the present invention is excellent in the performance for light switching an image display element such as liquid crystal display element.

By combining a photoconductive switching element with a functional element in a piece in the present invention, the reliability of connection between the photoconductive switching element and the functional element is improved.

Particularly, a device fabricated by combining a functional element showing a memory characteristic with a photoconductive switching element in a piece is detachable from the body which drives the device, and the device can be distributed separately. A user can see the display at any place and in any posture.

The voltage symmetry of a device having a functional film for removing the DC component is further improved, and the high voltage application is not required.

In the present invention, apparatuses which exhibit various functions can be obtained by connecting a driving mechanism for driving a device to the device having a photoconductive switching element as described hereinabove and a functional element combined together in a piece. Among such apparatuses, a recording apparatus having a display element as the functional element involves the high reflectance of the display element such as the liquid crystal display element.

In the recording apparatus and recording method of the present invention, by applying a special voltage, the display performance under light irradiation is secured, and the high performance low cost recording apparatus and recording method can be realized without high voltage application, long duration pulse application, or a large quantity of light irradiation. In detail, in the recording apparatus and recording method of the present invention, by applying a negative pulse as the final pulse on the device, even though a display element such as a cholesteric liquid crystal display element which requires sharp voltage drop when the voltage is turned off to turn on the display can be turned on efficiently. Furthermore, by applying a positive pulse as the first pulse on the device, the modulation effect is obtained.

What is claimed is:

1. A photoconductive switching element used for switching of a functional element driven by an AC electric field or AC current, comprising:
    a light transmissible substrate;
    at least one light transmissible electrode layer on the light transmissible substrate;
    a first charge generation layer on the at least one light transmissible electrode layer, the first charge generation layer generating at least one carrier and at least one electron when a light irradiates the first charge generation layer;
    a charge transfer layer on the first charge generation layer; and
    a second charge generation layer on the charge transfer layer, the second charge generation layer generating at least one carrier and at least one electron when the light is irradiated,
    wherein the AC electric field or AC current is applied between the light transmissible electrode layer and a second electrode layer above the second charge generation layer.

2. The photoconductive switching element as claimed in claim 1, wherein each of the charge generation layers includes a charge generation material and the charge transfer layer includes a charge transfer material, the charge generation material and the charge transfer material are mixed at an interface between the first or second charge generation layer and the charge transfer layer so that a mixing ratio of the charge generation material and the charge transfer material changes continuously in a lamination direction.

3. The photoconductive switching element as claimed in claim 1, wherein the substrate is a plastic substrate.

4. The photoconductive switching element as claimed in claim 1, wherein each of the charge generation layer and the charge transfer layer are made from an organic material.

5. A device, comprising:
    the photoconductive switching element of claim 1;
    a functional element electrically connected to the photoconductive switching element; and
    an electrode layer, wherein the electrode layer is electrically connected to at least one of the functional element and the photoconductive switching element.

6. The device as claimed in claim 5, wherein the photoconductive switching element and the functional element are unified in one piece.

7. The device as claimed in claim 6, wherein the functional element shows a memory characteristic.

8. The device as claimed in claim 6, wherein the functional element is a display element.

9. The device as claimed in claim 8, wherein the display element shows a memory characteristic.

10. The device as claimed in claim 8, wherein the display element is a liquid crystal display element.

11. The device as claimed in claim 10, wherein the liquid crystal display element is a bistable liquid crystal display element.

12. The device as claimed in claim 11, wherein the bistable liquid crystal element is a cholesteric liquid crystal display element.

13. A device, comprising:
    the photoconductive switching element of claim 1;
    a functional film for removing the DC component;
    a functional element; and
    an electrode layer, wherein the electrode layer is electrically connected to at least one of the functional element and the photoconductive switching element.

14. The device as claimed in claim 13, wherein the functional element is a display element.

15. The device as claimed in claim 14, wherein the functional film for removing the DC component has a capacitance component larger than that of the display element.

16. The device as claimed in claim 15, wherein the functional film for removing the DC component having a capacitance component larger than that of the display element is made of a material mainly containing an organic material selected from a group of polyvinylalcohol (PVA), polyvinylcarbazole, polyvinylacetate, polyethyleneoxide, and polybutylalcohol.

17. The device as claimed n claim 15, wherein the functional film for removing the DC component having a capacitance component larger than that of the display element is made of a material mainly containing an inorganic material selected from a group of Si—O, Ti—O, Al—O, Si—N, PZT, Ta—O, and Al—N.

18. An apparatus, comprising:
    a device having the photoconductive switching element as claimed in claim 1 and at least one selected from a functional element showing a memory characteristic, a display element, a display element showing a memory characteristic, a liquid crystal element, a bistable liquid crystal display element and a cholesteric liquid crystal display element which is unified with photoconductive switching element;
    an electrode layer, wherein the electrode layer is electrically connected to at least one of the functional element, the photoconductive switching element and the device; and
    a driver detachably and electrically connected to the device for driving the device.

19. An apparatus having the device as claimed in claim 13 and a driver connected detachably and electrically to the device for driving the device.

20. A recording apparatus comprising:
    the device of claim 6;
    a light writing unit that emits a light onto the photoconductive switching element; and
    a pulse input unit that supplies a positive pulse and a negative pulse to the device as the driving pulse that drives the device.

21. The recording apparatus as claimed in claim 20, wherein the pulse input unit applies the negative pulse as the final pulse, the positive pulse as the first pulse, or the positive pulse as the first pulse and the negative pulse as the final pulse.

22. The recording apparatus as claimed in claim 21, wherein the display element is a cholesteric liquid crystal display element, and the pulse input unit applies the negative pulse as the final pulse.

23. The recording apparatus as claimed in claim 21, wherein the device comprises a functional film for removing the DC component additionally.

24. A recording method using the recording apparatus as claimed in claim 21, comprising the steps of:
    applying the positive pulse and the negative pulse to the device as the driving pulse to drive the device; and emitting the light onto the photoconductive switching element for light writing,
wherein the negative pulse is applied as the final pulse, or the positive pulse is applied as the first pulse, or the positive pulse and a negative pulse are applied as the first pulse and as the final pulse respectively.

* * * * *